United States Patent
Rodrigues et al.

(10) Patent No.: US 7,430,059 B2
(45) Date of Patent: Sep. 30, 2008

(54) SYSTEMS, METHODS AND GRAPHICAL USER INTERFACES FOR INTERACTIVELY PREVIEWING A SCANNED DOCUMENT

(75) Inventors: Rudolph A. Rodrigues, Rochester, NY (US); Ralph H. Huedepohl, Bloomfield, NY (US)

(73) Assignee: Xerox Corporation, Norwalk, CT (US)

( * ) Notice: Subject to any disclaimer, the term of this patent is extended or adjusted under 35 U.S.C. 154(b) by 1016 days.

(21) Appl. No.: 10/851,201

(22) Filed: May 24, 2004

(65) Prior Publication Data

US 2005/0270601 A1 Dec. 8, 2005

(51) Int. Cl.
H04N 1/60 (2006.01)
H04N 1/00 (2006.01)
H04N 1/393 (2006.01)
G06K 15/00 (2006.01)

(52) U.S. Cl. ................ 358/1.9; 358/1.6; 358/1.18; 358/451

(58) Field of Classification Search ........... 358/1.9, 358/1.6, 1.18, 451, 506, 449, 500; 382/117, 382/103, 116
See application file for complete search history.

(56) References Cited

U.S. PATENT DOCUMENTS 6,577,751 B2 * 6/2003 Yamamoto ............... 382/117
6,614,456 B1    9/2003 Rzepkowski et al.
6,697,091 B1 * 2/2004 Rzepkowski et al. ...... 715/835

OTHER PUBLICATIONS

U.S. Appl. No. 09/487,266, filed Jan. 19, 2000, Rzepkowski et al.

* cited by examiner

Primary Examiner—Houshang Safaipour
(74) Attorney, Agent, or Firm—Oliff & Berridge, PLC

(57) ABSTRACT

A system and method for scanning and reprocessing an image, including capturing and storing scanned image data in a memory of an image scanner; processing the scanned image data in accordance with at least one predetermined image parameter; transmitting the processed image data to an image capture device control system; transmitting the processed image data on a display device; selecting at least on selectable image parameter; reprocessing the scanned image data stored in the memory in accordance with the at least one selected image parameter.

18 Claims, 18 Drawing Sheets

SYSTEMS, METHODS AND GRAPHICAL USER INTERFACES FOR INTERACTIVELY PREVIEWING A SCANNED DOCUMENT

BACKGROUND OF THE INVENTION

1. Field of Invention

This invention is directed to systems, methods and graphical user interfaces for an image capture device or an image forming device.

2. Description of Related Art

Scanners and other types of image capture devices as well as digital copiers and other image forming devices, have become ubiquitous office productivity tools for generating electronic images of physical original documents or generating physical copies of electronic images. Once an electronic image has been generated, either from scratch or from a physical original document, the electronic image data can be used in an infinite variety of ways to increase the productivity and the product quality of an office. Image capture devices include desktop scanners, other stand alone scanners, digital still cameras, digital video cameras, the scanning input portions of digital copiers, facsimile machines and other devices that are capable of generating electronic image data from an original document, and the like. These image capture devices can also include image databases that store previously captured electronic image data. Image forming devices may include digital copiers, laser printers, ink jet printers, color ink jet printers, and the like.

As the costs of these various image capture devices and image forming device have dropped and the output quality of the physical copies and the captured electronic image data has improved, these image capture devices and image forming devices have been provided with an ever increasing number of controllable features. Similarly, as users have become comfortable with capturing and using electronic image data obtained from original documents to create physical copies, the uses to which the electronic image data has been put, and thus the needed control over the quality and appearance of the electronic image data and the physical copies, have expanded greatly.

In response, standard interfaces between image capture devices, including those indicated above, and various application programs that use such captured electronic image data have been developed. Such standard interfaces allow standard compliant image capture devices and standard compliant applications to communicate easily. One exemplary embodiment of such a standard interface is the TWAIN™ interface. The TWAIN™ interface allows any TWAIN™ compliant application program to input and use electronic image data using any TWAIN™ compliant image capture device.

The TWAIN™-compliant component protocol facilitates communication between application programs and image capture devices, such as those indicated above. One such TWAIN™-compliant image capture device is the XEROX® DigiPath™ scanner.

SUMMARY OF THE INVENTION

In order to take advantage of all of the controllable features of the various related image capture devices or scanners, an operator or user of the scanner would prefer to obtain a preview image of the scanned image of the original document before outputting the scanned image to a printing device, storage medium, network, or the like. If the scanned image requires further enhancement, the user would adjust various scanning features or parameters, re-feed the document if using a document feeder, and physically re-scan the document to provide another preview image for review by the operator or user. In order to physically re-scan the document, an image sensor senses the original document to obtain an analog image, converts the sensed analog image into digital data, processes the image according to default or selected parameters, and outputs the digital data to a display to be previewed by the user.

Accordingly, every time the user wishes to change scanning parameters such as basic features, image size, or image quality of a document, the user first changes or adjusts the parameters, re-feeds the same document and physically re-scans the same document multiple times in order to provide the desired scanned image. Additionally, if the document is a duplex (double sided) document, the number of re-feeds and physical re-scans may increase further because the parameters used to provide a desired image on one side of the document may be different than the parameters used to provide a desired image on the other side of document. Moreover, there may be several different types of images on one side of a document. For example, one document may have both text and a picture. The best parameters to produce the desired picture may be different than the best parameters to produce readable text. Accordingly, multiple re-feeds and physical re-scans often become necessary to produce the desired scanned image.

Because the multiple re-feeds and physical re-scans requires the movement of moving parts, this increases the physical strain and repetitive motions of the image capture device, and reduces the life of the image capture device. Further, the user must handle the originals multiple times which increases the possibility of a document becoming bent, torn or otherwise damaged by the user. In addition, the constant re-feeding and physical re-scanning often causes the user to become frustrated due to the time required.

Accordingly, there is a continuing need to improve the workflow and productivity of an operator or user of an image capture device, as well as to increase the life of the image capture device by reducing the strain on both the hardware, the document and/or the user of the image scanner.

Some of the exemplary embodiments of this invention provide systems and methods for physically scanning a document or image once, storing the document or image in memory, and reprocessing the document or image stored in memory without physically rescanning the document.

Some of the exemplary embodiments of this invention provides systems and methods for physically capturing an image, storing the image in memory, and reprocessing the image stored in memory as often as needed without physically recapturing the image.

Some of the exemplary embodiments of this invention provide computer program products having computer readable program code for physically scanning a document or image once, storing the document or image in memory, and reprocessing the document or image stored in memory without physically rescanning the document.

In some of the various exemplary embodiments of the systems and method according to this invention, images are scanned and reprocessed by capturing and storing scanned image data in a memory of an image scanner, processing the scanned image data in accordance with at least one predetermined image parameter, transmitting the processed image data to an image capture device control system, previewing the processed image data on a display device; selecting at least one selectable image parameter, and reprocessing the scanned image data stored in the memory in accordance with the at least one selected image parameter.

In some of the various exemplary embodiments of the systems and method according to this invention, reprocessed images are transmitted from the image scanner to the image capture device control system.

In some of the various exemplary embodiments of the systems and method according to this invention, the reprocessed image data is displayed on a display device in communication with the image capture device control system.

In some of the various exemplary embodiments of the systems and method according to this invention, a window that bounds a portion of the processed image data can be defined.

In some of the various exemplary embodiments of the systems and method according to this invention, a second selectable image parameter for the portion of the processed image data can be selected.

In some of the various exemplary embodiments of the systems and method according to this invention, the scanned image data stored in the memory can be reprocessed in accordance with the a first selected image parameter and can be transmitted to the image capture device control system; and the scanned image data stored in the memory can be reprocessed in accordance with the a second selected image parameter and can be transmitted to the image capture device control system.

In some of the various exemplary embodiments of the systems and method according to this invention, image data reprocessed in accordance with the at least one selected image parameter other than the portion of the image data bound by the window can be displayed on the display device, and the portion of the image data reprocessed in accordance with at least the second selected image parameter corresponding to the portion bound by the window can be displayed.

In some of the various exemplary embodiments of the systems and method according to this invention, a system for reprocessing scanned image data, comprises an image scanner, an image capture device control system which provides at least one predetermined image parameter to the image scanner, and controls the image scanner to capture image data and generate the scanned image data; a memory of the image scanner which stores the scanned image data; a selector of the image capture control system which selects at least one selectable image parameter; and image processing electronics that reprocesses the scanned image data stored in the memory in accordance with the at least one selected image parameter from the image capture control system.

In some of the various exemplary embodiments of the systems and method according to this invention, a system for reprocessing scanned image data, further comprises a memory controller coupled to the memory; and a scanner control module which is coupled to the memory controller and image processing electronics, and which controls the reprocessing of scanned image data stored in the memory in accordance with the at least one selected image parameter from the image capture control system.

In some of the various exemplary embodiments of the systems and method according to this invention, the image capture control system can be in communication with a display device.

In some of the various exemplary embodiments of the systems and method according to this invention, the image capture control system can receive the reprocessed image data from the image scanner and display the reprocessed image data on the display device.

In some of the various exemplary embodiments of the systems and method according to this invention, a selector can select a window bounding a portion of the image data displayed on the display device and selects a second selectable image parameter for the image data bounded by the window.

In some of the various exemplary embodiments of the systems and method according to this invention, the image capture device control system provides the second selectable image parameter to the image scanner, and controls the image scanner to reprocess the scanned image data in accordance with the second selectable image parameter.

In some of the various exemplary embodiments of the systems and method according to this invention, the image capture device control system receives the reprocessed image data, the image capture device control system causes the display device to display the image data reprocessed in accordance with the at least one selectable image data other than the portion of the image data bound by the window and causes the display device to display the image data reprocessed in accordance with the second selectable image data corresponding to the portion bound by the window.

In some of the various exemplary embodiments of the systems and method according to this invention, a computer program product, comprises a computer usable medium having computer readable program code embodied therein for causing a computer to preview image data, said computer program product comprising computer readable program code for causing a computer to receive scanned image data captured by an image scanner; computer readable program code for causing a computer to enable selecting at least one image parameter; computer readable program code for causing a computer to send the at least one image parameter to the image scanner for reprocessing of the scanned image data in accordance with the at least one image parameter.

In some of the various exemplary embodiments of the systems and method according to this invention, a computer program product further comprises computer readable program code for causing a computer to receive and display the reprocessed image data.

In some of the various exemplary embodiments of the systems and method according to this invention, a computer program product further comprises computer readable program code for causing a computer to define a window to select a portion of the image data.

In some of the various exemplary embodiments of the systems and method according to this invention, computer readable program code for causing a computer to select a second selectable image parameter for the portion of the image data bounded by the window.

In some of the various exemplary embodiments of the systems and method according to this invention, computer readable program code for reprocessing the scanned image data stored in the memory in accordance with a first selected image parameter; computer readable program code for transmitting the image data reprocessed in accordance with a first selected image parameter to the image capture device control system; computer readable program code for reprocessing the scanned image data stored in the memory in accordance with a second selected image parameter; and computer readable program code for transmitting the image data reprocessed in accordance with the second selected image parameter to the image capture device control system.

In some of the various exemplary embodiments of the systems and method according to this invention, computer readable program code for displaying the image data reprocessed in accordance with the first selected image parameter other than the portion of the image data bound by the window; and computer readable program code for displaying the portion of the image data reprocessed in accordance with the second selected image parameter corresponding to the portion bound by the window.

These and other features and advantages of this invention are described in or are apparent from the following detailed description of various exemplary embodiments of the systems, methods and graphical user interfaces according to this invention.

BRIEF DESCRIPTION OF THE DRAWINGS

Various exemplary embodiments of this invention will be described in detail, with reference to the following figures, wherein.

DETAILED DESCRIPTION OF EXEMPLARY EMBODIMENTS

The following detailed description of exemplary embodiments is particularly directed to an image capture device and an image capture device control system that generates electronic image data from the image carried on an original document. Thus, the following detailed description of various exemplary embodiments of systems, methods and graphical user interfaces according to this invention will make specific reference to an image capture device and image capture device control system that capture and process an electronic image from an original document.

Figure 1:
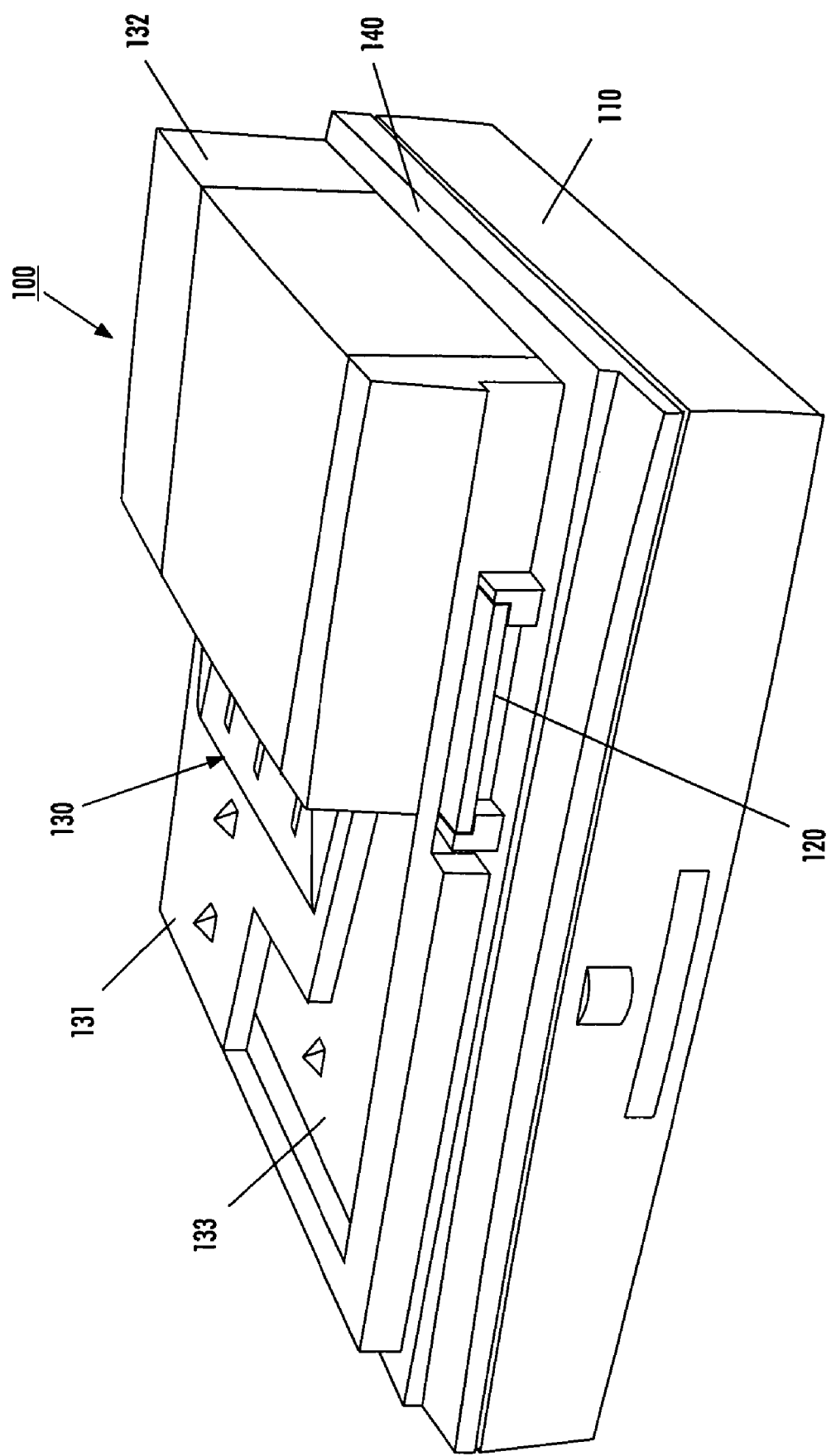
FIG. 1 is a perspective view of an exemplary electronic image generating device.

FIG. 1 illustrates a first exemplary embodiment of an image capturing device 100 usable with image previewing systems, methods and graphical user interfaces according to this invention. As shown in FIG. 1, the image capture device 100 includes a control panel 110, a document platen 120 on which an original document can be placed to generate corresponding electronic image data, and a document handler or automatic document feeder 130. In particular, the document handler 130 may include a feed tray 131 on which the original document can be placed and a document feeder 132 which feeds documents in turn from the feed tray 131 to the image sensor 140. Documents are then returned to an output tray 133 after electronic image data is generated therefrom.

It should be appreciated that the image capture device can also be variously referred to as a scanner, an electronic image data capture device, an electronic image data generating device, an image data capture device, or the like, and, regardless of the name, can be any one of a stand-alone scanner, a digital copier, a facsimile machine, a multi-function device, a digital still camera, a digital video camera, an electronic image database that stores previously generated electronic image data, or any other known or later device that is capable of generating (or supplying) electronic image data from an original document.

Figure 2:
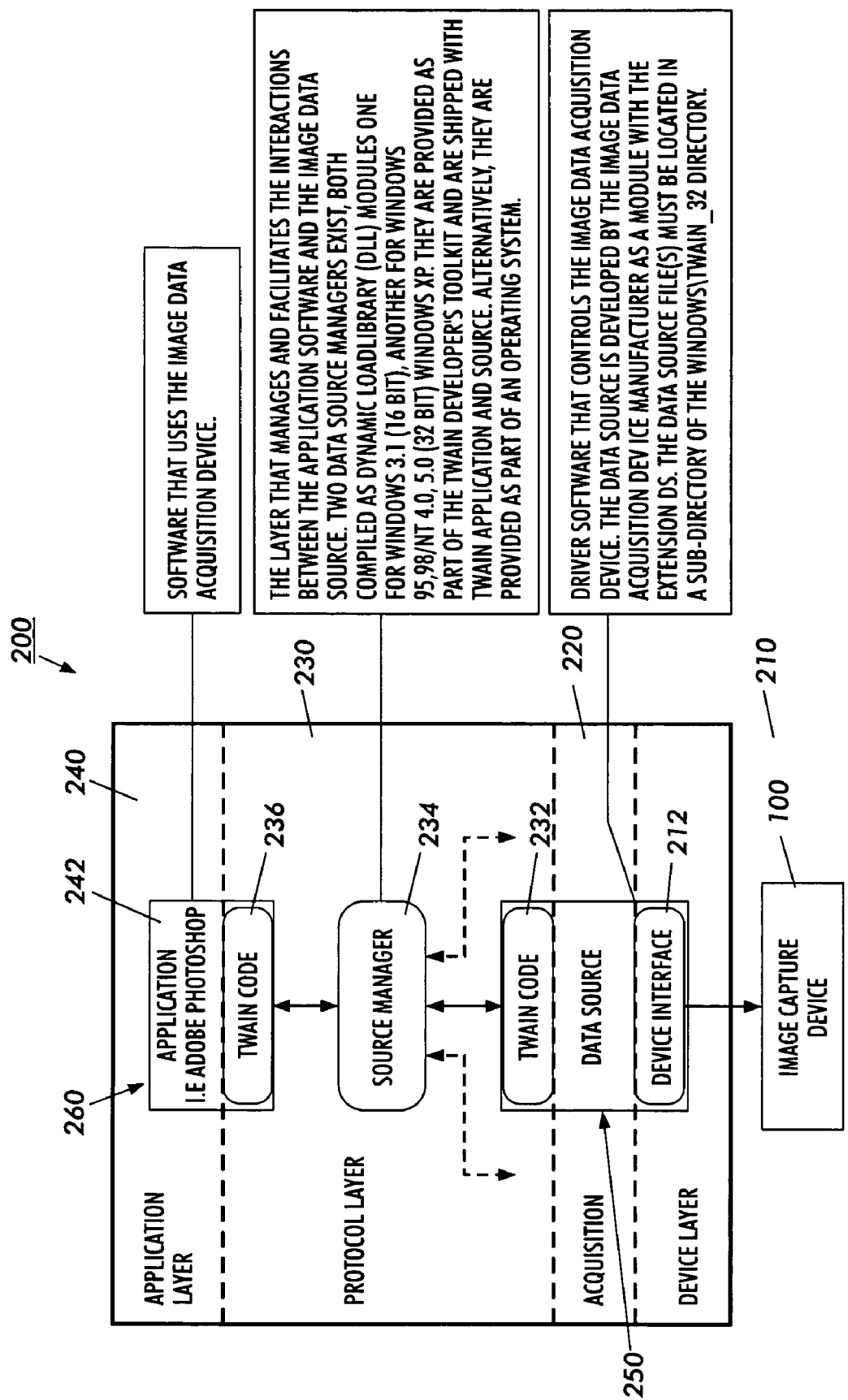
FIG. 2 is a block diagram illustrating a first exemplary embodiment of an image capture device control system that incorporates various exemplary embodiments of the image previewing systems, methods and graphical user interfaces according to this invention.

FIG. 2 is a block diagram illustrating a first exemplary embodiment of an image capture device control system 200 that incorporates various image previewing systems, methods and graphical user interfaces according to this invention. The image capture device control system 200 can be any computing system capable of communicating with an image capture device 100. The image capture device control system can be a host computer, a personal computer, a workstation, a personal digital assistant, a server, a network, or the like.

As shown in FIG. 2, the image capture device control system 200 includes a device layer 210, an acquisition layer 220, a protocol layer 230, and an application layer 240. In particular, the device layer 210 communicates with the image capture device 100, such as a Xerox® DigiPath™ color scanner or any other electronic image data capture devices. Although the image capture device 100 is shown separate from the image capture device control system 200, the image capture device 100 may be integrated into the device layer 210 of the image capture device control system 200. The device layer 210 also includes a device interface portion 212 of a TWAIN™ driver or data source 250. The TWAIN™ driver or data source 250 is just one exemplary embodiment of a driver or data source. In particular, as shown in FIG. 2, the data source 250 bridges the device layer 210, the acquisition layer 220 and the protocol layer 230. As indicated, the TWAIN™ driver or data source 250 is just on exemplary embodiment of a driver or data source. Accordingly, applications 260 are preferably compliant with whatever driver or data source is used.

The protocol layer 230 includes a TWAIN™ code portion 232 of the data source 250, a source manager 234 and a TWAIN™ code portion 236 of a TWAIN™-compliant application 260. Examples of applications 260 include Adobe® Photoshop®, Scansoft® Paperport Deluxe®, Microsoft® Office® applications, and the like. The application layer 240 includes an application portion 242 of the application 260.

As shown in FIG. 2, control and/or data signals are communicated between the image capture device 100 and the data source 250 through the device interface portion 212. Similarly, control and/or data signals are communicated between the data source 250 and the source manager 234 through the code portion 232. The control and/or data signals are also communicated between the source manager 234 and the application 260 through the code portion 236. In various exemplary embodiments, the data source 250 controls the image capture device 100. In such exemplary embodiments, the data source 250 may be developed by the manufacturer of the image capture device 100.

The source manager 234 manages and facilitates interactions between the application 260 and the data source 250. In various exemplary embodiments, one or more of two distinct source managers 234 may be implemented. Both may be compiled as dynamic loading library modules. One exemplary dynamic load library implementation of the source manager 234 may be a 16-bit program developed for, for example, Microsoft® Windows® 3.1. The other dynamic load library implementation of the source manager 234 may be a 32-bit program developed for Windows® 95/98, Windows® NT 4.0/5.0, and Windows® XP. In general, these two dynamic load library modules may be provided as part of the data source developers tool kit, with each compliant application and/or at each compliant electronic image data generating device. These two dynamic load library modules may also be provided as part of the operating system.

Figure 3:
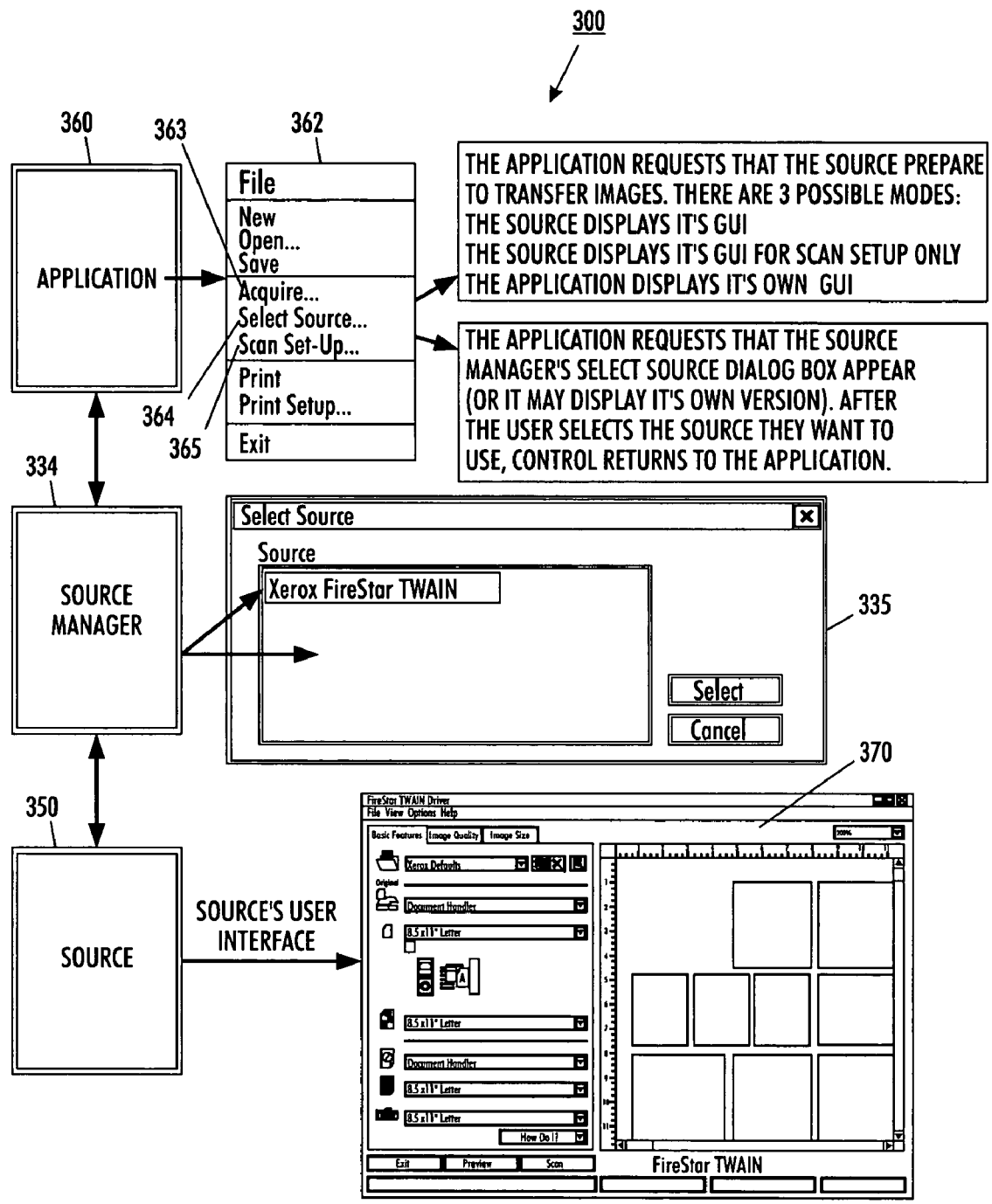
FIG. 3 is a second exemplary embodiment of an image capture device control system that incorporates various exemplary embodiments of the image previewing systems, methods and graphical user interfaces according to this invention.

FIG. 3 illustrates a second exemplary embodiment of an image capture device control system 300 that incorporates various image previewing systems, methods and graphical user interfaces according to this invention. As shown in FIG. 3, a FILE menu 362 of a compliant application 360 includes a plurality of menu items that provide an interface to a compliant electronic image data capture device (not shown), such as a compliant scanner. These menu items may include, for example, an Acquire menu item 363, a Select Source menu item 364 and/or a Scan Set-Up menu item 365.

As shown in FIG. 3, selecting the Acquire menu item 363 causes the application 360 to request that the image capture device prepare to capture electronic image data from an original document and/or transfer captured electronic image data to the image capture device control system 300. In particular, in response to selection of the Acquire menu item 363, the application 360 can display a corresponding graphical user interface. Alternatively, the data source 350 for the selected electronic image data capture device can display a corresponding graphical user interface. Finally, if the Scan Set up menu item 365 is selected, the data source 350 can display a corresponding Scanner Set-Up graphical user interface.

In particular, as shown in FIG. 3, when a select source menu item 364 is selected, the application 360 accesses the source manager 334. In response, the source manager 324 accesses the data source 350. The source manager 334 then displays, in a graphical user interface 335, all data sources 350 present in the image capture device control system 300. Once the user selects the particular data source 350 that the user wishes to use, the data source 350 displays a graphical user interface 370 that allows the user to select various image capture parameters and scanning control functions implemented in the selected data source 350.

Figure 4:
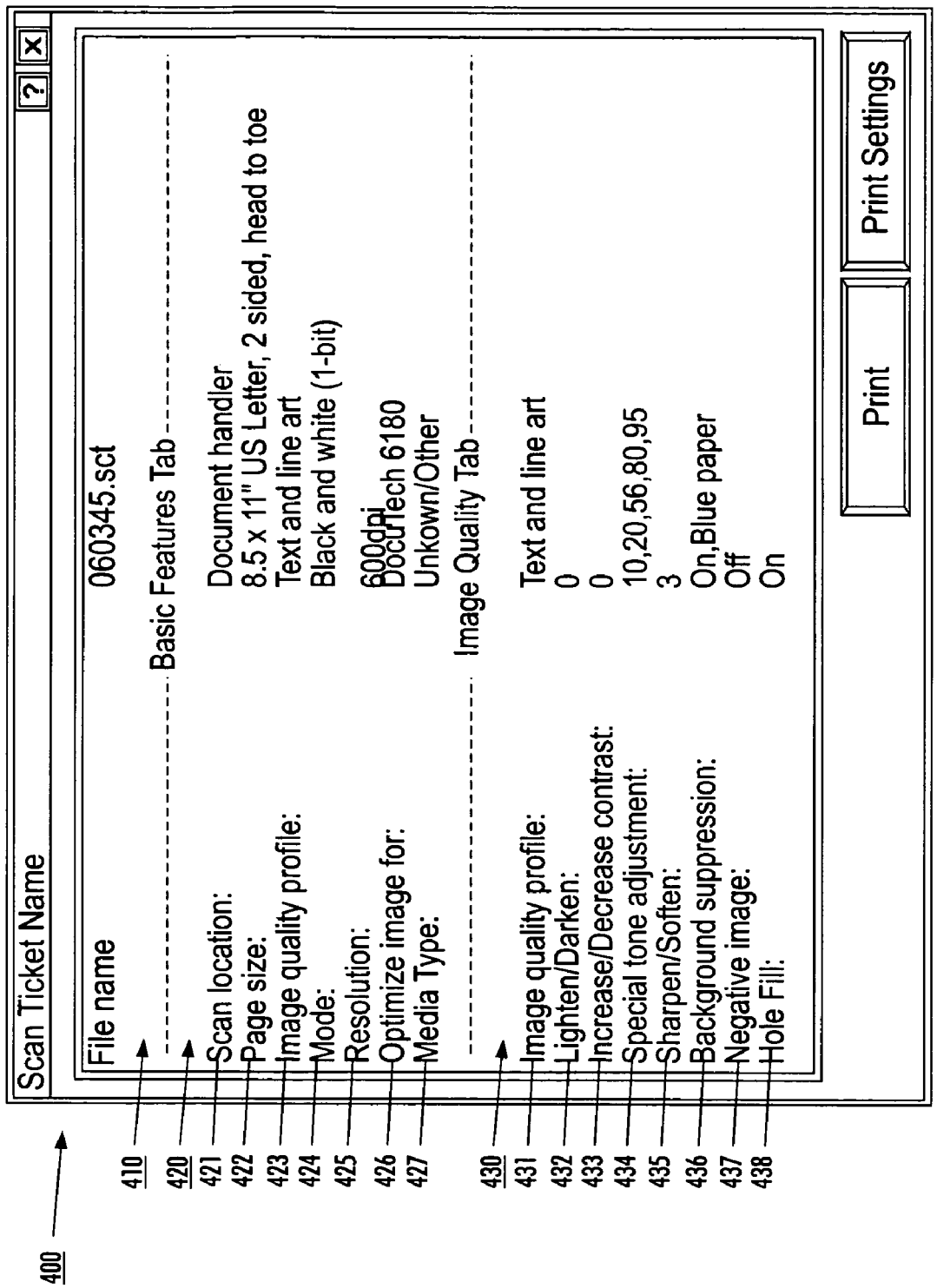
FIG. 4 is an exemplary embodiment of a scan ticket illustrating various image scanning parameters according to this invention.

FIG. 4 illustrates one exemplary embodiment of a scan ticket 400. Scan tickets contain all of the settings in the graphical user interface, as discussed in greater detail below. In general, there will be one or more scan ticket or sets of saved scan parameters for each language supporting the data source according to this invention. When the graphical user interface is displayed, only those scan tickets or sets of saved scan parameters for the language the user is currently operating in are displayed. When a scan ticket or set of saved scan parameters is selected, all the settings contained within that scan ticket are used to populate the graphical user interface according to this invention.

As shown in FIG. 4, the scan ticket 400 may include a file name portion 410, a basic features portion 420, an image quality portion 430, an image quality windows portion, if required, and an image size portion (not shown). The basic features portion 420 corresponds to the basic features tab of the graphical user interface 370 shown in FIG. 3. Similarly, the image quality portion 430 and the image size portion correspond to the image quality tab and the image size tab, respectively, of the graphical user interface 370 shown in FIG. 3.

As shown in FIG. 4, the basic features portion 420 includes a scan location parameter 421, an input original document size (page size) parameter 422, an original image quality profile parameter 423, a mode parameter 424, a resolution parameter 425, image optimization parameter 426, and media type parameter 427. The image quality portion 430 includes an image quality profile parameter 431, a brightness parameter 432, an increase/decrease parameter 433, a special tone adjustments parameter 434, a sharpen/soften parameter 435, a background suppression parameter 436, a negative image parameter 437, and a hole fill parameter 438.

In particular, the scan location parameter 421 indicates whether feeder or platen will be used to capture electronic image data from a particular original document. The page size parameter 422 indicates the size of the input document, whether the input document is single-sided or double-sided, and, if the original document is double-sided, how the two images on each side of the original document are oriented relative to each other. The image quality profile parameter 423 indicates image characteristics of and enhancements to be applied to the original document when it is made into its electronic form. The mode parameter 424 indicates the particular image capture mode to be used. For example, the image of the original document could be captured as a binary bitmap image, as shown in FIG. 4 or, as an 8-bit grayscale image, or as a color image having various color spaces and bit depths.

The resolution parameter 425 indicates the resolution of the generated electronic image data. The image optimization parameter 426 indicates a particular output device, such as a particular laser printer, a particular ink jet printer, a particular digital copier, or the like, that will be used to generate hard copies of the generated electronic image data and thus for which the electronic image data should be optimized for when the electronic image data of the original document is captured.

The image quality profile parameter 431 of the image quality portion 430 is the same as the image quality profile parameter 423. The lighten/darken parameter 432 indicates whether the electronic image data is to be lighter or darker than the images on the original document. Similarly, the increase/decrease contrast parameter 433 indicates whether the contrast of the electronic image data is to be greater or less than the contrast of the images on the original document. The special tone adjustment parameter 434 is used to provide finer control over the tone reproduction curve that is used to convert the continuous tone image values of the original document to the multi-bit-depth image values of the generated electronic image data. This is described in greater detail in U.S. Pat. No. 6,614,456 B1 and incorporated herein by reference in its entirety.

The sharpen/soften parameter 435 used to indicate whether the edges within the images in the original document should be sharpened or softened in the generated electronic image data. The background suppression parameter portion 436 is used to indicate whether background suppression should be used, and if so, the color or other quality of the background of the original document that is to be suppressed. The negative image parameter 437 indicates whether the generated electronic image data should be a negative image relative to the images on the original document. Various other ones of the particular scanning parameters discussed above are further disclosed in U.S. Pat. No. 6,697,091 B1, and U.S. patent application Ser. No. 09/487,266 filed on Jan. 19, 2000, each of which is incorporated herein by reference in its entirety. However, this list is not exhaustive. A scanning parameter can be any parameter that impacts the image processing of a document.

Figure 5:
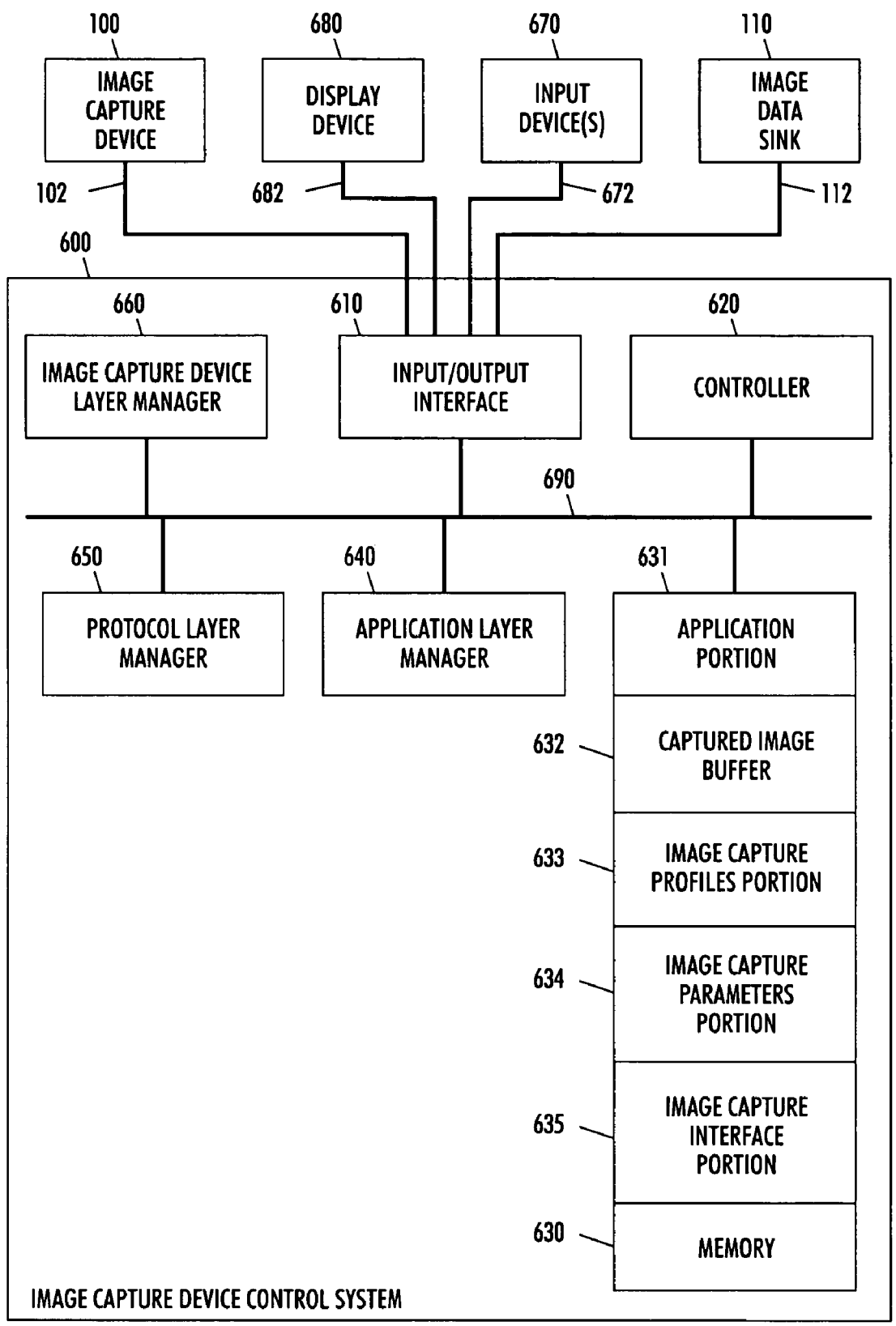
FIG. 5 is a block diagram illustrating a third exemplary embodiment of an image capture control system that incorporates various exemplary embodiments of the image previewing systems, methods and graphical user interfaces according to this invention.

FIG. 5 is a block diagram illustrating a third exemplary embodiment of an image capture device control system 600 that incorporates the image previewing systems methods and graphical user interfaces according to this invention. As shown in FIG. 5, the image capture device control system 600 includes an input/output interface 610, a controller 620, a memory 630, an application layer manager 640, a protocol layer manager 650, and an image capture device layer manager 660, each interconnected by a data/control bus 690.

The image capture device 100 is connected to the input/output interface 610 using a link 102. Similarly, an image data sink 110 can be connected to the input/output interface 610 using a link 112. The links 102 and 112 can each be any known or later developed device or system for connecting the image capture device 100 and the image data sink 110, respectively, to the image capture device control system 600, including a direct cable connection, a connection over a wide area network or a local area network, a connection over an intranet, a connection over an extranet, a connection over the Internet, or a connection over any other distributed processing network or system. In general, the links 102 and 112 can each be any known or later developed connection system or structure usable to respectively connect the image capture device 100 and the image data sink 110 to the image capture device control system 600. It should also be appreciated that the links 102 and 112 can be wired or wireless links that use portions of the public switch telephone network and/or portions of a cellular communication network.

It should also be appreciated that, in general, the image data sink 110 can be any device that is capable of outputting or storing electronic images generated using the image capture device control system 600 using the systems, methods and graphical user interfaces according to this invention, such as a printer, a copier, any other image forming device, a facsimile device, a display device, a storage device, or the like.

While FIG. 5 shows the image capture device 100, the image capture device control system 600 and the image data sink 110 as separate devices, the image capture device control system 600 may be integrated with either or both of the image capture device 100 and/or the image data sink 110, such as, for example, in a digital copier. With such a configuration, for example, the image capture device 100, the image data sink 110 and the image capture device control system 600 may be contained within a single device.

The input device or devices 670 can include any one or more of a mouse, a keyboard, a touch pad, a track ball, a touch screen, or the like, or any other known or later developed device that is capable of inputting data and control signals over the link 672 to the input/output interface 610. Similarly, the display device 680 can be any known or later developed display device, including a cathode ray tube type monitor, a flat screen type monitor, an LCD monitor, or any other known or later developed device on which the graphical user interfaces according to this invention can be displayed and interacted with using one or more of the input devices 670. The display device 680 is provided with control and/or data signals from the input/output interface 610 over the link 682.

Like the signal lines 102 and 112, the links 672 and 682 can be any known or later developed device or system for connecting the input devices 670 and the display device 680, respectively, to the image capture device control system 600, including a direct cable connection, a connection over a wide area network or local area network, a connection over a intranet, a connection over an extranet, a connection over the Internet, a connection over the public switched telephone network, a connection over a cellular network, or a connection over any other distributed processing or communications network or system, including both or either wired and wireless systems. In general, the links 672 and 682 can each be any known or later developed connection system or structure usable to connect the input devices 670 and the display device 680, respectively, to the image capture device control system 600.

The memory 630 includes an application portion 631 in which an application program and any application files used by that application program can be stored. Similarly, the captured image buffer 632 is used to store the captured image data input from the image capture device 110 over the signal line 102 and through the input/output interface 610. In general, the captured electronic image data will be stored in the captured image buffer 632 under control of the controller 620 the image capture device layer manager 660, the protocol layer manager 650 and/or the application layer manager 640.

The image capture profiles portion 633 stores the image capture profiles as well as job tickets 400, and the like. The image capture parameters portion 634 stores a current set of the image capture parameters to be used by the image capture device 100 when capturing an image. The image capture interface portion 635 stores the various graphical user interfaces, for example, as shown in FIGS. 10-16.

The application layer manager 640 manages the application layer 240 (FIG. 2), and in particular, the application portion 242 of any executing applications 260.

The protocol layer manager 650 manages the protocol layer 230, including the source manager 234. The protocol layer manager 650 manages communications with the application layer manager 640 using the code portion 236 of the executing application(s) 260.

The image capture device layer manager 660 manages each of the data sources 250 that may be implemented for each image capture device 100 that may be accessible by the image capture device control system 600 over various links 102. In particular, the image capture device layer manager 660 communicates with the protocol layer manager 650 using the code portion 232 of the particular data source 250. Similarly, the image capture device layer manager 660 manages communications with the image capture device 100 through the input/output interface 610 and over the link 102 using the device interface portion 212.

The image capture device layer manager 660 causes various image capture graphical user interfaces, such as the graphical user interface 370 shown in FIG. 3, to be displayed on the display device 680. The user can then change and/or input the various image capture parameters. The various image capture parameters can be input through the various graphical user interfaces that the image capture device layer manager 660 displays on the display device 680. Then, after the user saves the various image capture parameters or initiates the corresponding image capture device, the image capture device layer manager 660 stores the selected image capture parameters in the image capture parameters portion 640. The image capture device layer manager 660 then outputs the selected image capture parameters through the input/output interface 610 and over the link 102 to the image capture device 100. The image capture device 100 then uses the various image capture parameters received from the image capture device control system 600 when capturing electronic image data from an original document and when supplying that capture electronic image data over the link 110 to the image capture device control system 600.

Figure 6:
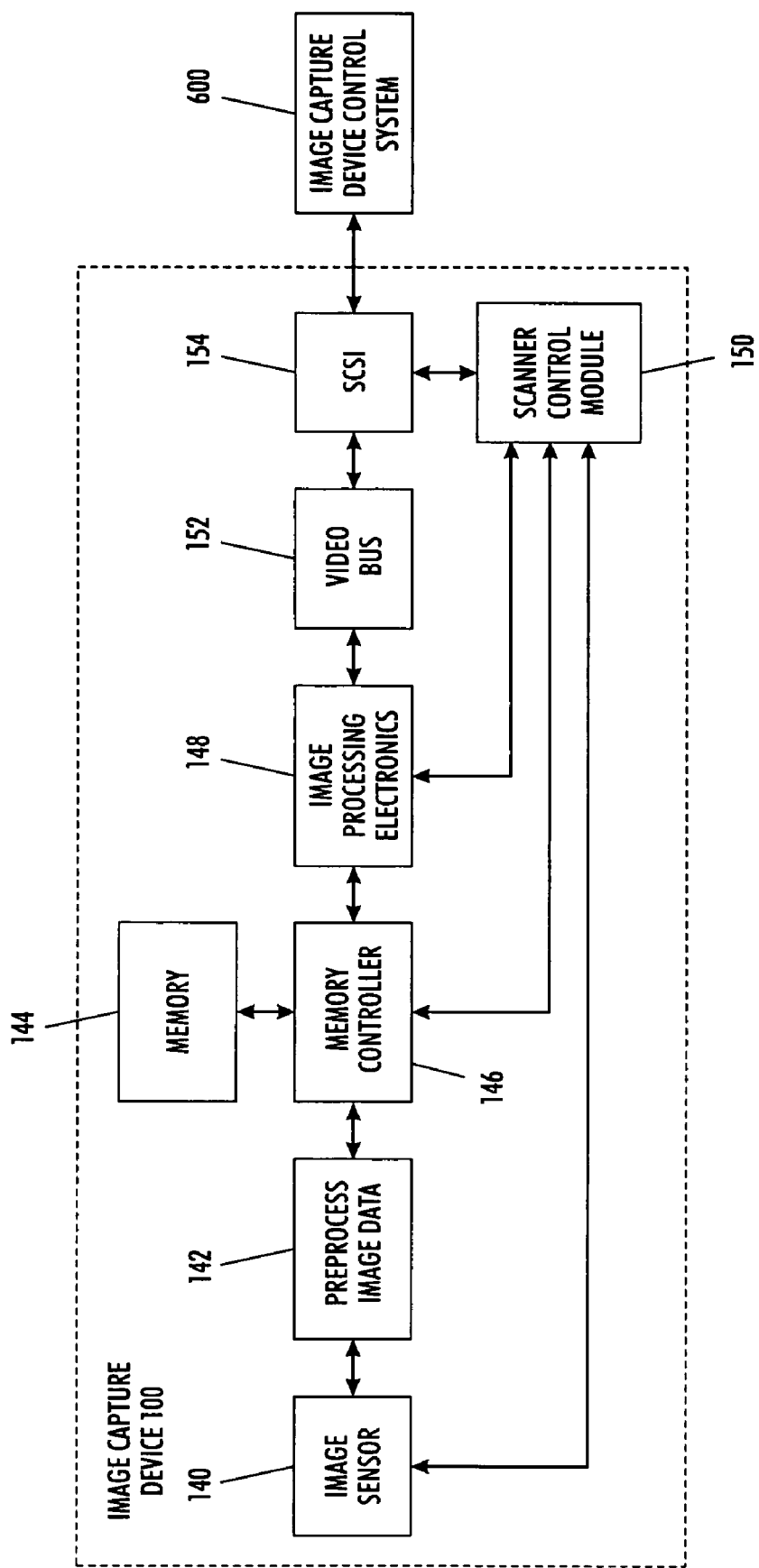
FIG. 6 is a block diagram illustrating an exemplary embodiment of an image capture device.

FIG. 6 is a block diagram of an exemplary embodiment of the image capture device 100 that captures an analog image, converts the analog image to a digital image, implements processing of the digital image in accordance with scan parameters provided by the image capture device control system 600, and outputs the scanned image to the image capture device control system 600 for displaying in a graphical user interface on the display device 680 or to be sent to the image data sink 110.

As shown in FIG. 6, an image capture device 100 includes an image sensor 140 for capturing an analog image of a document. The image sensor 140 is coupled to a preprocess image data module 142, which processes the image data for storage in a memory 144 (e.g., a buffer) under the control of a memory controller 146. The image sensor 140, or the preprocess image data module 142, converts the captured analog image into a digital image for preprocessing by the preprocess image data module 142. The memory controller 146 is coupled to image processing electronics 148, which receives the digital image stored in the memory 144 by way of the memory controller 146 and processes the digital image in accordance with default scan parameters or selected scan parameters from the image capture control system 600. The memory controller 146 and the image processing electronics 148 are controlled by a scanner control module 150. The scanner control module 150 sets up the image processing electronics 148 and then instructs the memory controller 146 to send the image stored in the memory 144 through the image processing electronics 148. The image processing electronics 148 outputs the processed digital image to a video bus 152, which is coupled to a SCSI 154. The SCSI 154 outputs the digital image (scanned image) from the image capture device 100 to the input/output interface 610 of the image capture control system 600 for display in a graphical user interface, such as the graphical user interface 370. The SCSI 154 is just one example of an interface. Other interfaces known or later developed interfaces may be used as well. In addition, it should be appreciated that the image capture device control system 200 shown in FIG. 2 can be substituted for the image capture device control system 600 shown in FIG. 6.

Figure 7A:
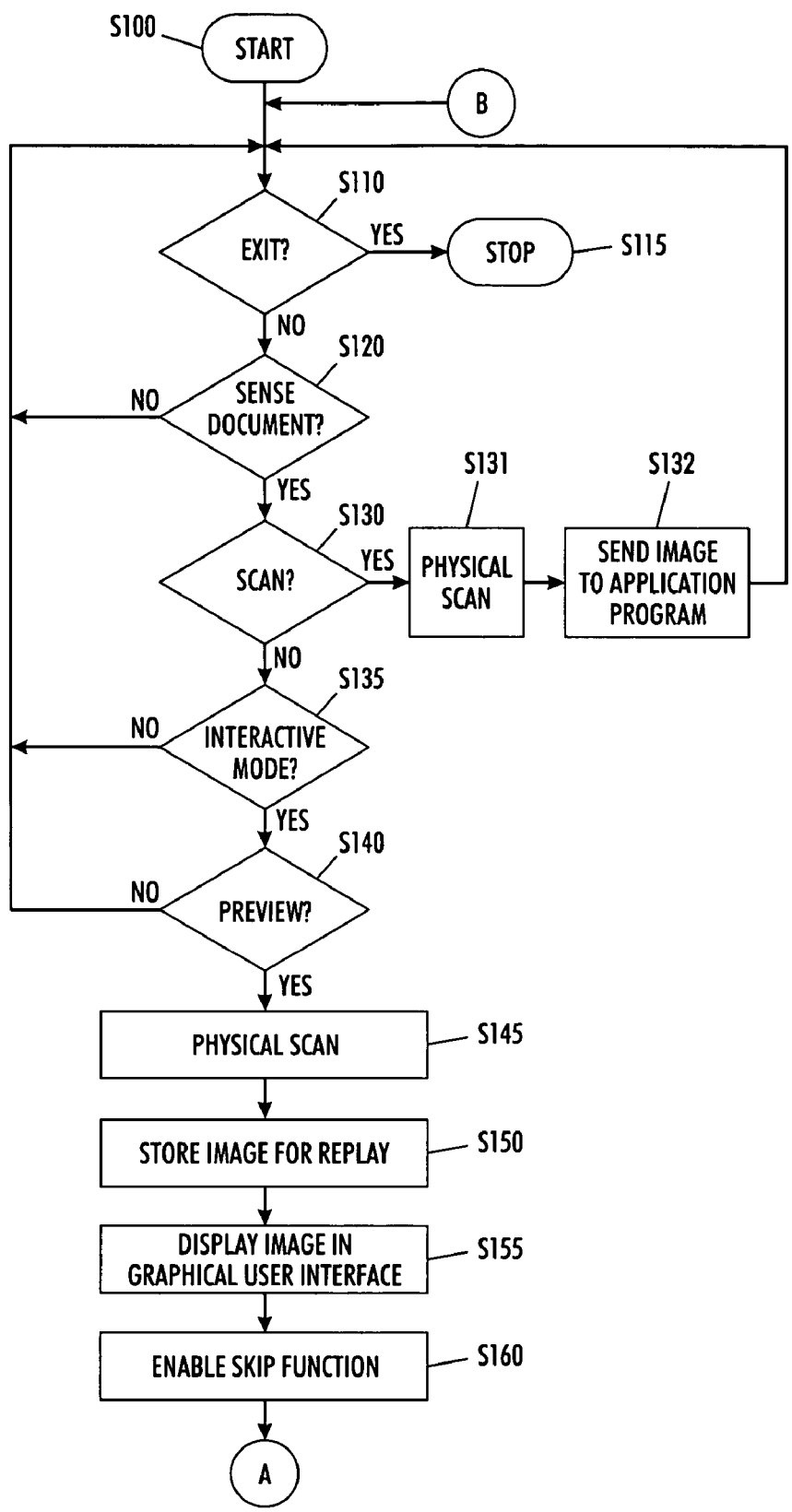
FIGS. 7A-7B show a flowchart outlining one exemplary embodiment of a method for generating, displaying and using an interactive preview graphical user interface according to this invention.
Figure 7B:
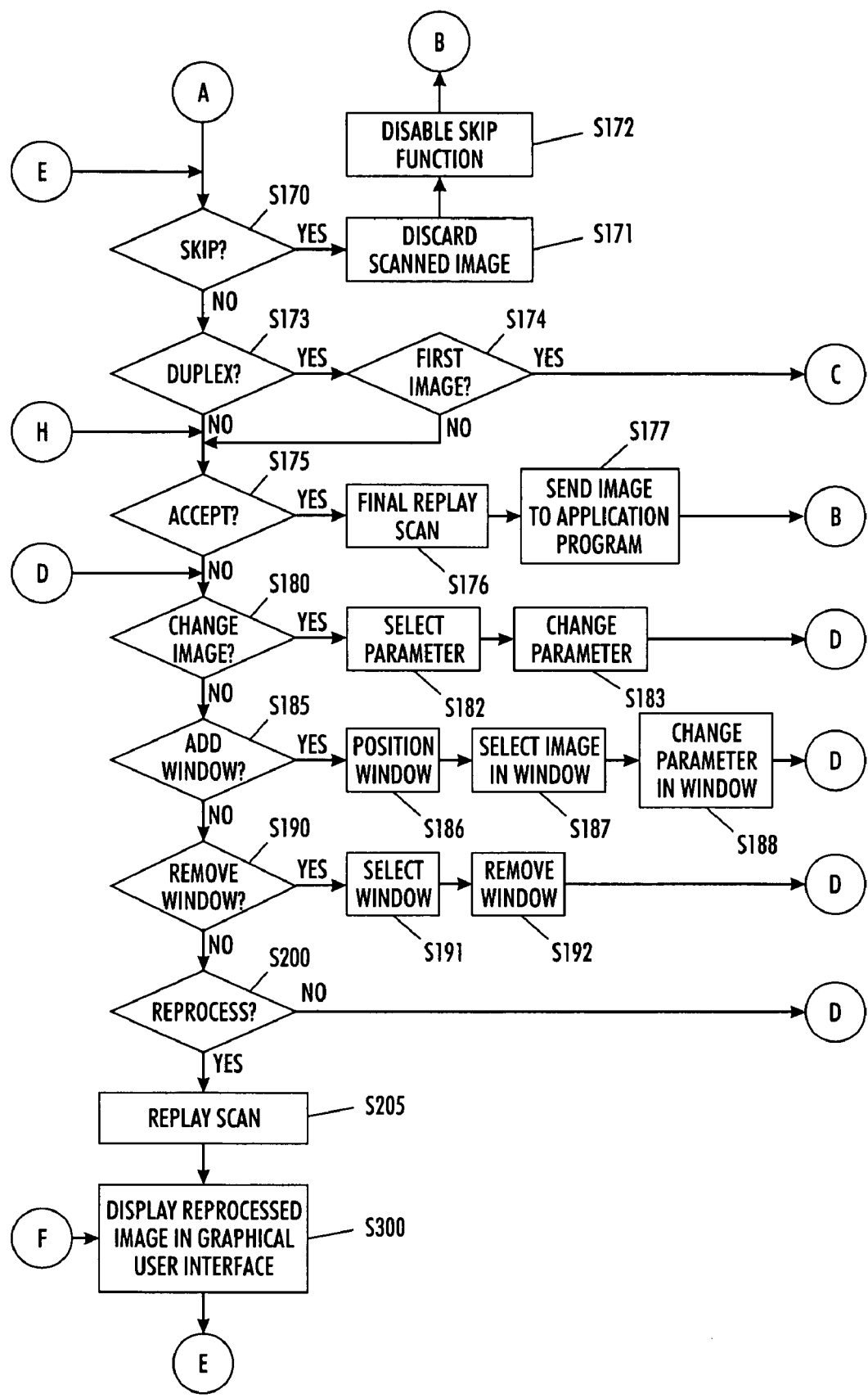

FIGS. 7A-7B illustrate a flowchart outlining one exemplary embodiment of a method for generating, displaying and using an interactive preview graphical user interface according to this invention. Although an automatic document feeder will be referred to throughout this exemplary embodiment, this method may also be applied to scanning a document on a platen. In addition, although image capture device control system 600 shown in FIG. 6 is referred to below, it should be appreciated that the image capture device control system 200 shown in FIG. 2 can be substituted for or incorporated into the image capture device control system 600 shown in FIG. 6. Moreover, it should be appreciated that in the exemplary embodiments, selections using a combination of software and hardware can be made during the method steps shown in the figures. The combination of hardware and software enabling a user to make a selection can be referred to as a selector.

Beginning in step S100, which occurs whenever the graphical user interface for scanning a document is accessed, control continues to step S110. By using a computer mouse, or other currently available or later developed input device, a user can command and control the image capture device control system 600 and the image capture device 100 to exit a program, perform a scan of a sensed document, or preview a scanned document. A document may contain one or more pages. By selecting exit in step S110, the user can exit the graphical user interface in step S115.

If exit is not selected, control continues to step S120. If a document is not sensed in step S120, the image capture device 100 continues to check whether the automatic document feeder 130 detects a document. Once a document is detected, control continues to step S130 where it is determined whether the user has selected physically scanning the document without reviewing any pages of the document. If it is determined that the user has selected to physically scan the document without previewing the document, control continues to step S131. In step S131, the image capture control system 600 sends a command to scan the image to the scanner control module 150 by way of the SCSI 154. The scanner control module 150 commands the image sensor 140 to capture an image of the document, which is preprocessed by the preprocess image data module 142 and stored in the memory 144 by the memory controller 146. In accordance with default scan parameters, the image processing electronics 148 receives the image under the control of the memory controller 146 and the scan control module 150 and processes the captured image to provide a scanned image. The image processing electronics 148 transmits the scanned image to the video bus 152, which sends the scanned image to the image capture device control system 600 by way of the SCSI 154. Control continues to step S132 where the image capture device control system 600 sends the scanned image to an application program, which can be accessed by the user at the image capture device control system 600.

However, if it is determined that the user has not selected to scan the document without previewing in step S130, control continues to step S135. In step S135, if it is determined that the user has not selected an interactive mode (also called 'single page mode'), then control returns to step S110. Otherwise, if it is determined that the user has selected an interactive mode using the graphical user interface, control continues to step S140. In step S140, if it is determined that the user has not chosen to preview the document, then control returns to step S110. Otherwise, if it is determined that the user has selected to preview the document, control continues to step S145 where a physical scan is performed as discussed above with respect to step S131. However, instead of sending the scanned image to the image application program as in step S132, the scanned image is stored in a temporary memory of the image capture device control system 600, such as captured image buffer 632, in step S150. It should be noted that the preprocessed image is still stored in the memory 144 of image capture device 100.

After the scanned image is stored in the temporary memory, the image capture device control system 600 accesses the scanned image and generates a graphical user interface which displays the scanned image on display device 680 in step S155. Examples of such a graphical user interface are shown in FIGS. 10-16. Control continues to step S160, where a skip function is enabled. It should be understood that the skip function is preferably enabled at any point after it is determined that a user wishes to preview a document.

Control continues to step S170. In step S170, if it is determined that the user has decided to discard a scanned image displayed in the graphical user interface, control moves to step S171 where the image capture device control system 600 discards the scanned image displayed in the graphical user interface. Subsequently, control moves to step S172 where the skip function is disabled. Control then returns to step S110 to sense the next document.

Figure 9:
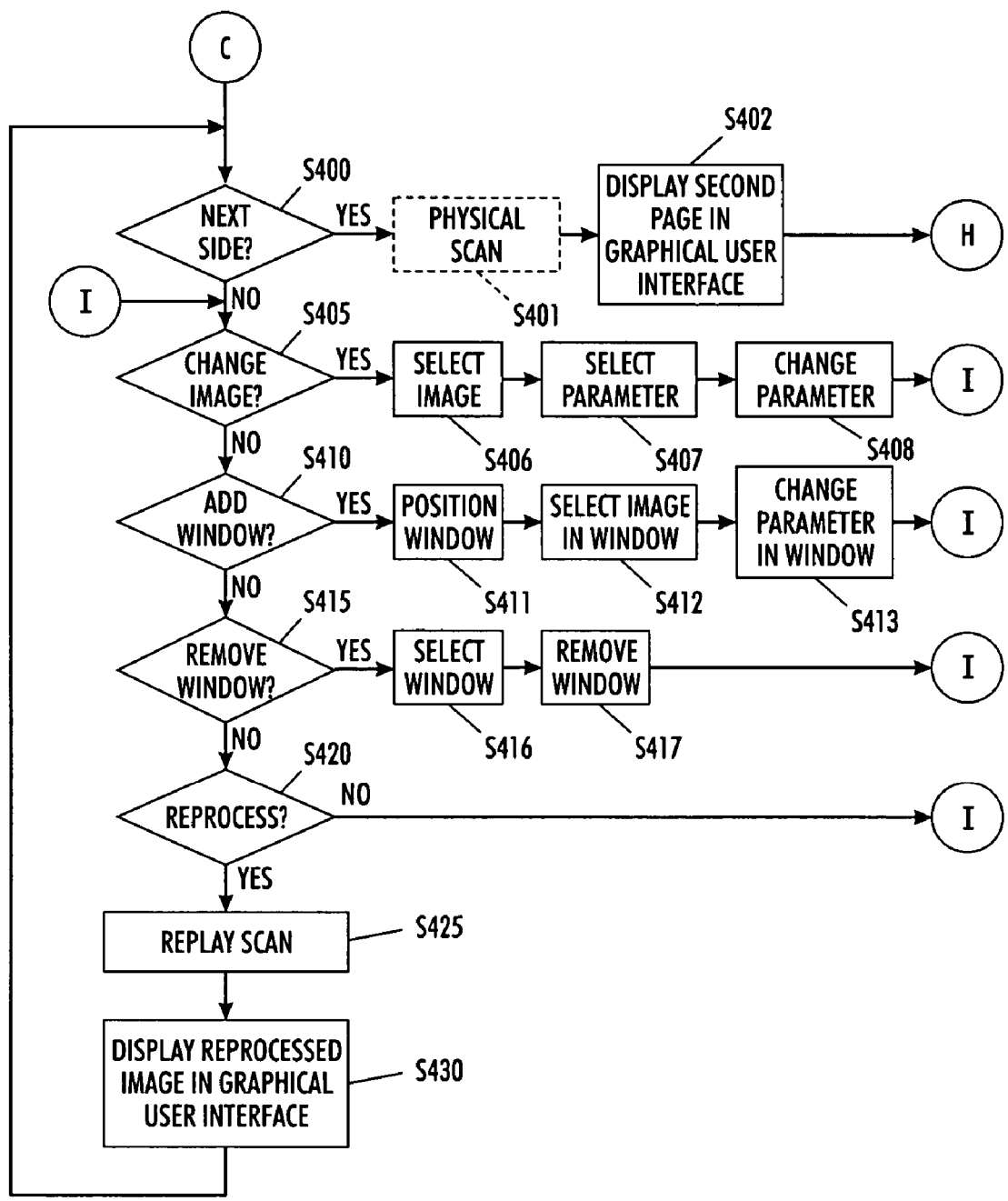
FIG. 9 shows a flowchart outlining a duplex feature for one exemplary embodiment of a method for generating, displaying and using an interactive preview graphical user interface for duplex documents.

In step S170, if it is determined that the user has not selected to skip the scanned image, control moves to step S173. In step S173, if it is determined that the document is duplex, control continues to step S174. In step S174, if it is determined that the first image is displayed in the graphical user interface, then control continues to step S400, as shown in FIG. 9, which is discussed in greater detail below. In step S174, if it is determined that the second image is displayed in the graphical user interface, then control continues to step S175.

In step S173, if it is determined that the document is simplex, control jumps to step S175. In step S175, it is determined that the user has accepted the document, a final replay scan is implemented in step S176, which is discussed in greater detail below with reference to FIGS. 8A and 8B. Subsequently, the image is sent to the application program in step S177, and control then returns to step S110.

Figure 13:
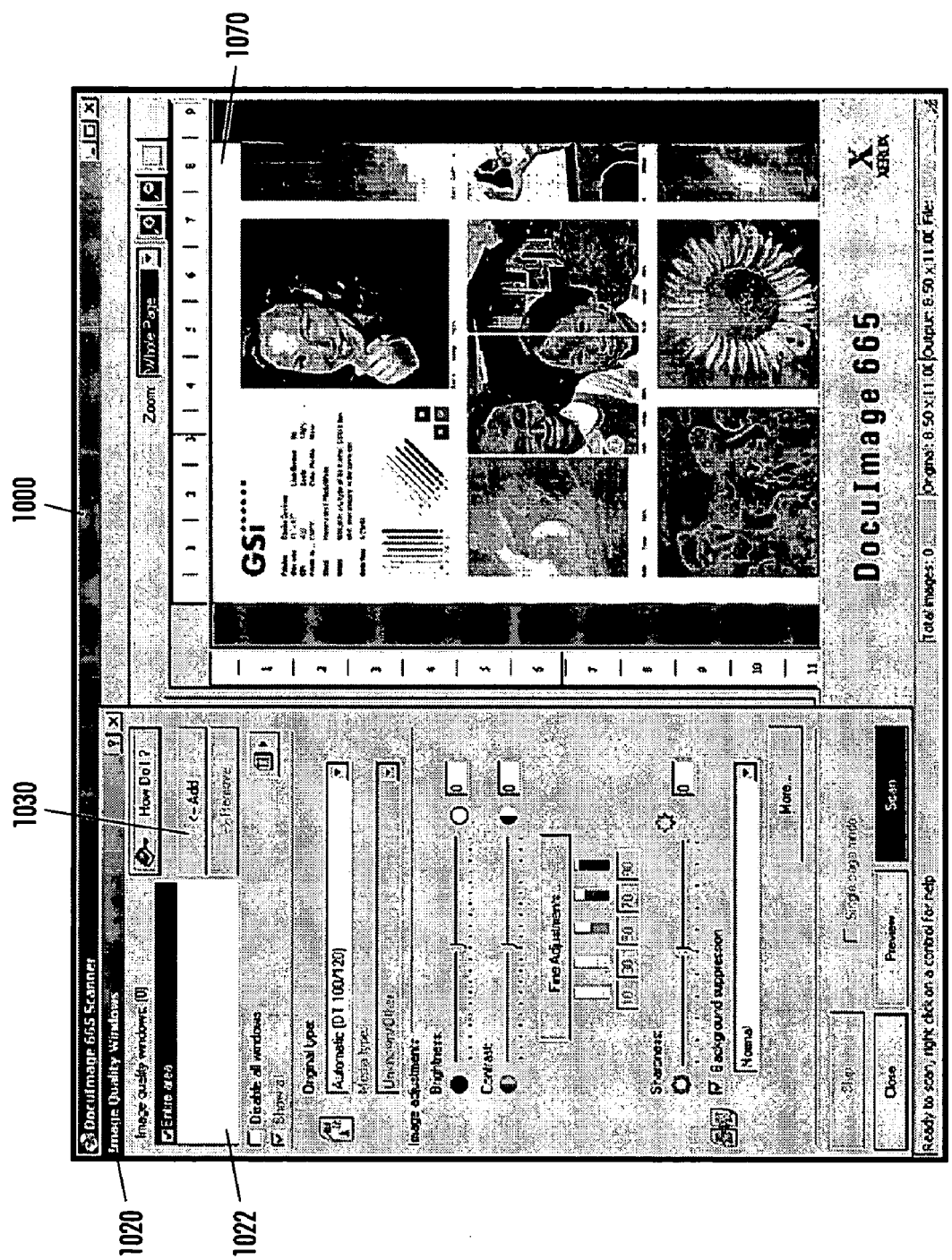
FIG. 13 shows a fourth exemplary embodiment of a graphical user interface according to this invention.

In step S175, if it is determined that the user has not accepted the scanned image, control jumps to step S180. In step S180, if it is determined that the user has decided to change the scanned image in the graphical user interface, the scanned image is selected in step S181. Control continues to step S182 where a scan parameter is selected. Control continues to step S183 where the scan parameter can be changed. Steps S180-S183 may be repeated until as many of the parameters for processing the scanned image as desired are changed. In step S180, when it is determined that there are no more changes to the parameters of the scanned image, control moves to step S185. In step S185, it is determined whether the user has decided to add a window. A user may choose to add a window, for example, as shown in FIG. 13, when the user wishes to change the scan parameters for a portion of the scanned image, for example, shown in FIG. 10. After positioning the window in step S186 and selecting the window in step S187, the user can change the parameters for processing the portion of the scanned image in the window independent from the rest of the scanned image in step S188. Steps S185 through S188 can be repeated as many times as desired to add as many windows as desired.

In step S185, when it is determined that there are no more windows to be added, control moves to step S190. In step S190, it is determined whether the user has selected to remove a window. If a user has decided to remove a window, the user selects the window to be removed in step S191 and the window is removed in step S192. By removing the window, the parameters applied to the portion of the scanned image in the removed window are now the same as that of the portions of the scanned image that are not located in another window. Removal of the window does not mean deletion of the portion of the scanned image within the window. In step S190, if it is determined that no windows are to be removed, then controls continues to step S200.

In step S200, it is determined whether the user has decided to reprocess the captured image stored in the memory 144 in accordance with the current scanning parameters. If it is determined that the user does not wish to reprocess the image at this time, control returns to step S180 so that changes to the scanned image including changing scanned parameters, adding windows or removing windows can be implemented as described above.

However, once it is determined that the user wishes to reprocess the image in step S200, control continues to step S205 where the replay scan is implemented. The implementation of step S205 is discussed in greater detail below with reference to FIGS. 8A and 8B. After the replay scan in step S205 is completed to provide a scanned image in accordance with the scan parameters, the scanned image based on the scan parameters is displayed in the graphical user interface of display device 680 in step S300, and control returns to step S170.

Accordingly, steps S170-S300 enable the user to change the scan parameters and display the scanned image in the display device 680 without physically scanning the document multiple times. As discussed above, once the scanned image appearing in the graphical user interface is accepted in step S175, a final replay scan is implemented and the scanned image is sent to a desired application program in step S177 for use by the desired application program and the next document is fed automatically by the feeder for a physical scan or the current document is removed from the platen by the user and replaced with a new document. Control then returns to step S110.

Figure 8A:
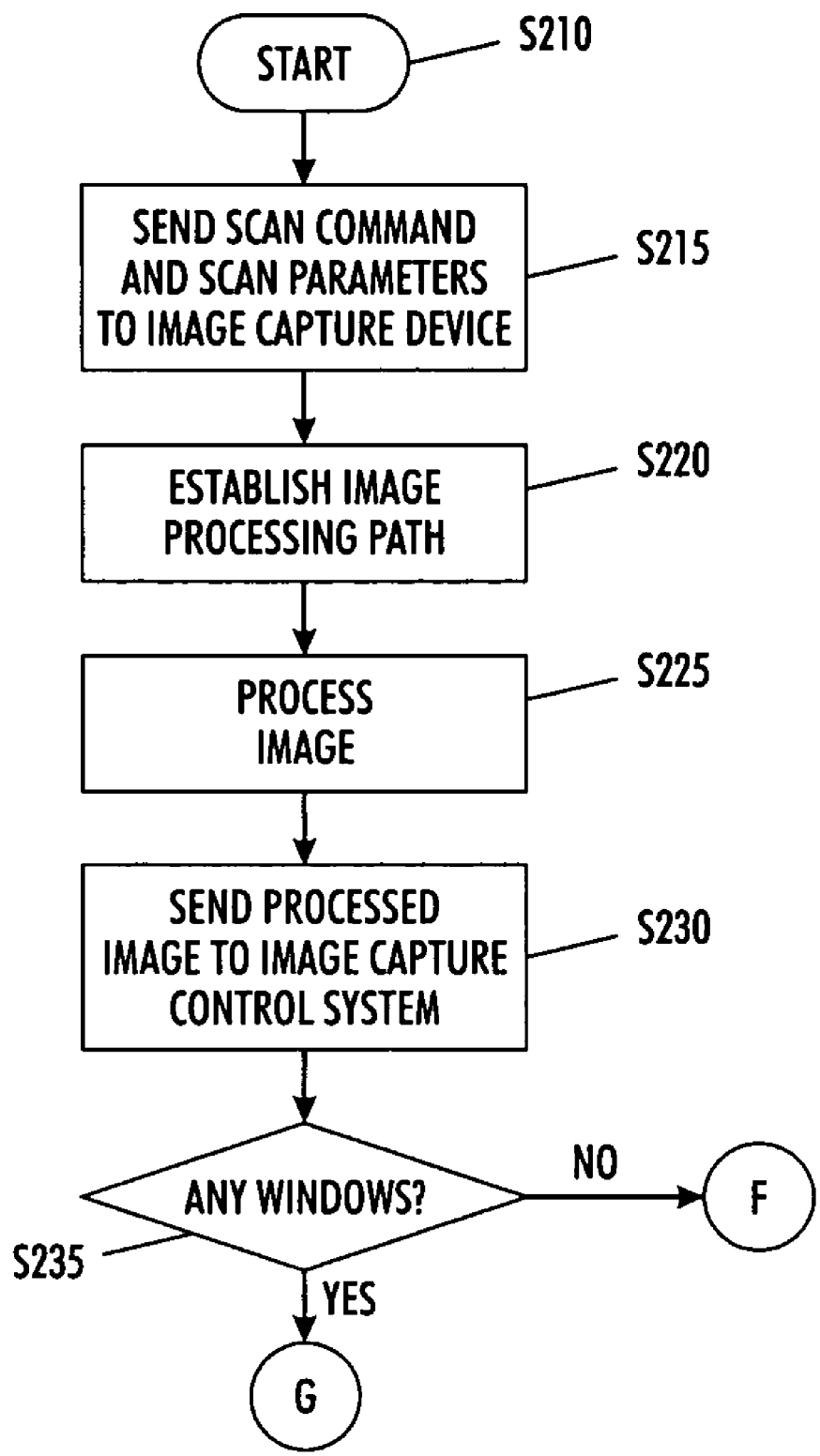
FIGS. 8A-8B show a flowchart outlining one exemplary embodiment of a replay scan according to this invention.
Figure 8B:
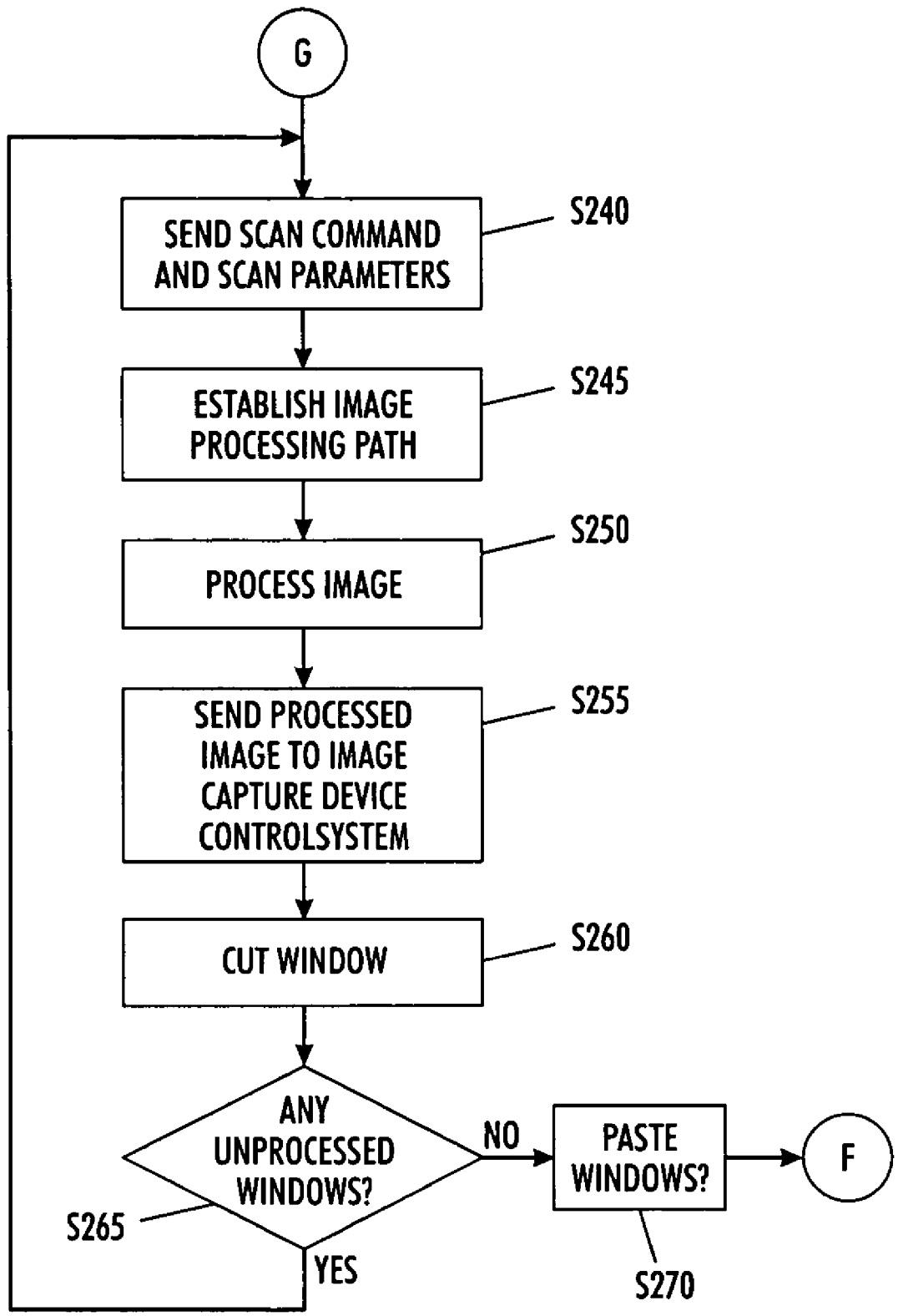

FIGS. 8A-8B illustrate a flowchart outlining one exemplary embodiment of the replay scan step S205 or the final replay scan step S176, collectively referred to as replay scan. Beginning in S210 control continues to step 215. In step S215, a scan command and the current scan parameters are sent to the image capture device 100 by the image capture device control system 600. Next, an image path is established at the direction of the scanner control module 150 in step S220. Then, in step S225, the preprocessed image stored in the memory 144 is sent through the established image path to process the image to provide a scanned image in accordance with the scan parameters provided by the image capture device control system 600. Then, in step S230, the scanned image is sent to the image capture device control system 600. For the purposes of this explanation, this scanned image is now referred to as the entire area scanned image.

Next, in step S235, it is determined whether any windows have been added. If no windows have been added, control moves to step S300 so that the reprocessed image is displayed in the graphical user interface. Then, control returns to step S170.

If the flowchart of FIG. 8A is for the final replay scan step S176, control continues to step S177, rather than step S300, so that the final scanned image can be sent to the application program.

Otherwise, if it is determined in step S235 that windows exist, control continues to step S240. In step S240, a scan command and scan parameters of a window are sent from the image capture device control system 600 to the image capture device 100. Next, in step S245, an image path is established at the direction of the scanner control module 150. Then, in step S250, the preprocessed image stored in the memory 144 is sent through the established image path to process the image to provide a scanned image in accordance with the scan parameters of the window provided by the image capture device control system 600. Then, in step S255, the scanned image is sent to the image capture device control system 600. After the scanned image is received, the portion of the scanned image corresponding to the window is cut out from the scanned image to provide a window scanned image in step S260.

Then, if it is determined that there are no other windows in step S265, the window scanned image is pasted into the appropriate location of the entire area scanned image to provide a desired scanned image in step S270, which is then displayed to the user in the graphical user interface in step S300. Then, control returns to step S170.

If the flowchart of FIG. 8B is for the final replay scan step S176, control continues to step S177, so that the final scanned image can be sent to the application program.

Alternatively, if it is determined that there are additional windows in step S265, then steps S240 through S265 are repeated until all windows have been processed so that the window scan images can be pasted into the entire area scanned image in step S270, which is displayed to the user in the graphical user interface in step S300 and/or sent to the application program in step S177.

FIG. 9 illustrates a flowchart outlining one exemplary embodiment of a method for generating, displaying and using an interactive preview graphical user interface for duplex documents. As discussed above, if in step S170 it is determined that the user has not selected to skip the scanned image, control jumps to step S173. If it is determined that the document is duplex in step S173, and the first image is being displayed in the graphical user interface, control continues to step S400, as shown in FIG. 9.

If it is determined that the first page scanned image is acceptable in step S400, a user can request the next page, so that the second page scanned image from the duplex page is displayed in the graphical user interface in step S402 and control returns to step S175. Alternatively, if the memory 144 only contains the first page of a scanned image and does not contain a second page of a scanned image, then the image capture device 100 physically scans the second image page, preprocesses the second page, stores the second image page in the memory 144, processes the second image page and sends the second image page to the image capture device control system 600 in step S401 for displaying in a graphical user interface in step S402. It should be understood that step S401 is optional, and is not needed when the memory 144 contains the second page of the scanned image. Then, control returns to step S175.

Figure 10:
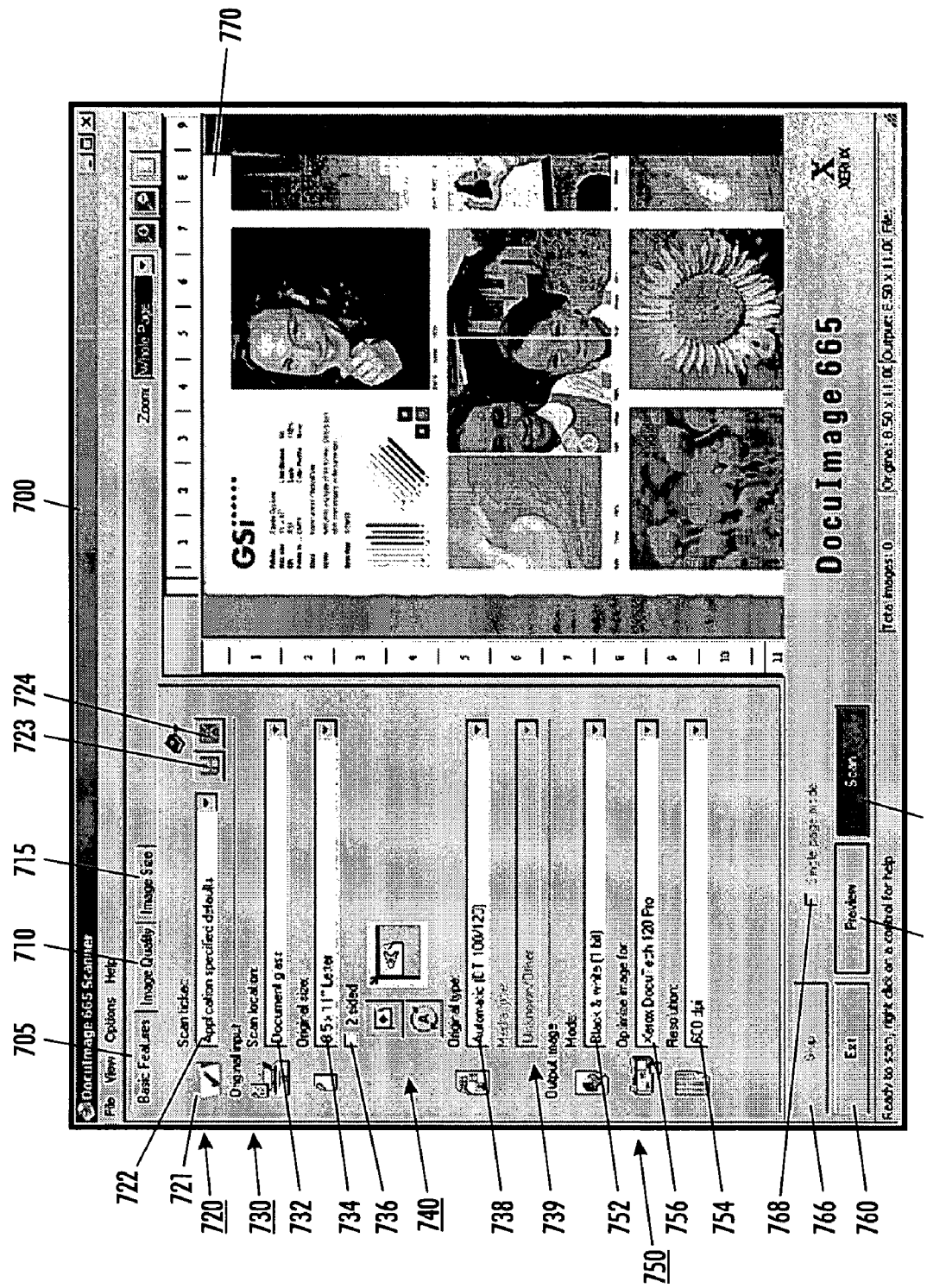
FIG. 10 shows a first exemplary embodiment of a graphical user interface according to this invention.

Alternatively, if it is determined that the user has not accepted the first page scanned image, control jumps to step S405. In step S405, if it is determined that the user has decided to change the scanned image in the graphical user interface, a scanned image is selected in step S406 and a parameter of the scanned image is selected in step S407. Control continues to S408 where a scan parameter can be changed. Steps S405-S408 may be repeated until all of the parameters for processing the scanned image are changed as desired. When it is determined that there are no more changes to the parameters of the scanned image in step S405, control jumps to step S410. In step S410, it is determined whether the user has decided to add a window. A user may choose to add a window, for example, as shown in FIG. 13, when the user wishes to change the scan parameters for a portion of the scanned image, for example, as shown in FIG. 10. After positioning the window in step S411 and selecting the window in step S412, the user can change the parameters for processing the portion of the scanned image in the window independent from the rest of the scanned image in step S413. Steps S410 through S413 can be repeated as many times as desired to add as many windows as desired.

When it is determined that there are no more windows to be added in step S410, control jumps to step S415. In step S415, it is determined whether the user has selected to remove a window. If a user has decided to remove a window, the user selects the window to be removed in step S416 and the window is removed in step S417. By removing the window, the parameters applied to the portion of the scanned image in the removed window are now the same as that of the portions of the scanned image that are not located in another window. Removal of the window does not mean deletion of the portion of the scanned image within the window. If it is determined that no windows are to be removed in step S415, then control jumps to step S420.

In step S420, it is determined whether the user has decided to reprocess the captured image stored in the memory 144 in accordance with the current scanning parameters. If it is determined that the user does not wish to reprocess the image at this time, control returns to step S405 so that changes to the scanned image including changing scanned parameters, adding windows or removing windows can be implemented as discussed above.

However, once it is determined that the user wishes to reprocess the image in step S420, control continues to step S425 where the replay scan is implemented. The implementation of step S425 is discussed above with respect to FIGS. 8A and 8B. After the replay scan in step S425 is completed to provide a scanned image in accordance with the scan parameters, the scanned image based on the scan parameter is displayed in the graphical user interface of display device 680 in step S430 and control returns to step S400. Once the scanned image appearing in the graphical user interface is considered acceptable by the user in step S400, the next image is displayed in step S402 in the graphical user interface and control returns to step S175 for processing the second page image.

FIG. 10 shows one exemplary embodiment of a graphical user interface 700. Graphical user interface 700 includes a basic features tab 705, an image quality tab 710, and an image size tab 715. The basic features tab 705 includes a scan ticket portion 720, an original document portion 730, and image capture portion 740. An example of an image quality tab 710 is described in U.S. Pat. No. 6,614,456 B1, which is incorporated by reference in its entirety. An example of a basic features tab 705 is described in U.S. Pat. No. 6,697,091 B1, which is incorporated herein in its entirety. All of the tabs and windows of the graphical user interface 700 may also include a task-specific user instruction button to access an operating instructions help function as disclosed in the 266 application.

Figure 16:
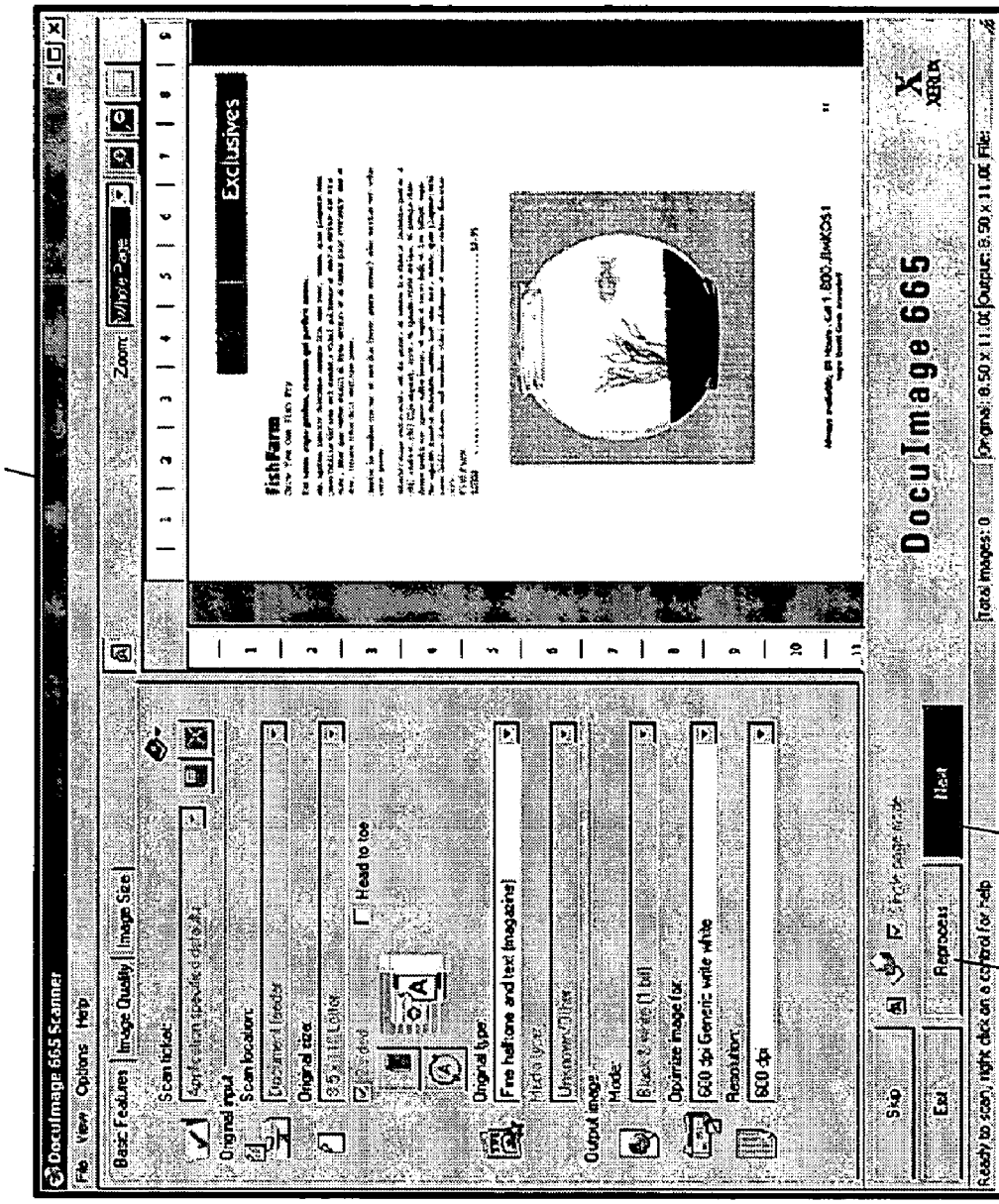
FIG. 16 shows a seventh exemplary embodiment of a graphical user interface according to this invention.

The graphical user interface 700 further includes an exit button 760, a preview button 762, a scan button 764, a skip button 766, interactive mode or single page mode check box 768, and a preview pane 770. The exit button 760 permits a user to exit the program. The preview button 762 permits the user to preview a physically scanned document. If a document has not been previewed, then the scan button 764 can physically scan a document, which is sent directly to the application program, as discussed above. If a document is being previewed, then the preview button 762 is replaced with a reprocess button and the scan button 764 is replaced with an accept button so that a previewed image can be reprocessed or accepted to generate the final scan, as discussed above. FIG. 16 illustrates reprocess and accept buttons.

The scan ticket portion 720 includes a status icon 721 that indicates the saved status of the scan ticket indicated in a scan ticket selection box 722. The current image capture parameters input into each of the basic features tab 705, the image quality tab 710 and the image size tab 715 can be saved to the scan ticket named in the scan ticket selection box 722 by selecting the save scan ticket button 723. In addition, the named scan ticket displayed in the scan ticket selection box 722 can be deleted by selecting the delete scan ticket button

724. A show scan ticket button may be added to allow the user to quickly view all of the currently loaded scan settings in a text list. This allows the user to view the information on every setting without having to navigate all of the various dialogues in the various portions of the graphical user interface 700.

The original document portion 730 of the basic features tab 705 includes a scan location list box 732, a page size list box 734, a double-sided check box 736, and an image quality profile list box or original type list box 738. The original document portion 730 also includes a document orientation portion 740, described in greater detail below, that allows the user to specify how the document will be oriented on the platen 120 or document feeder 130 of the image capture device 100.

The image quality profile (also called 'original type') list box 738 allows the user to select an image quality profile. Each image quality profile is a collection of all the settings on the image quality tab and the various windows and other graphical user interface items that are accessed through the image quality tab 710. In particular, the image quality profile list box 738 will include the same image quality profiles as will be provided on the image quality tab 710. When an image quality profile is selected using the image quality profile list box 738, the image quality profile parameters displayed in the various portions of the image quality tab 710 will be change accordingly. The image media type list box 739 allows the user to select the media type (i.e. xerographic, lithographic, etc.) of the original when scanning in color modes.

An image capture portion 750 of the basic feature tab 705 includes a mode list box 752, a resolution list box 754, and an optimize image list box 756. The mode list box 752 allows the user to select the output mode of the image capture device 100. The possible modes, include, but are not limited to, 1-bit or black/white captured images, 8-bit or grayscale captured images, or various types of 24-bit captured images, including red/green/blue (RGB) color, standard red/green/blue (sRGB) color and Luminance/Blue Chromaticity/Red Chromaticity (YCbCr) color.

The resolution list box 754 allows the user to select the output resolution of the captured image, in dots per inch (dpi). The optimize image list box 756 allows the user to select the output device for which the various captured image quality parameters on the image quality tab 710 should be set to so that the captured image, when printed on the selected output device, will provide the highest quality output image. In particular, in one exemplary embodiment, when a printer is selected in the optimize image list box 756, the tone reproduction curve (TRC) for the 1-bit (black/white) mode is selected as the tone reproduction curve for the indicated printer.

Figure 11:
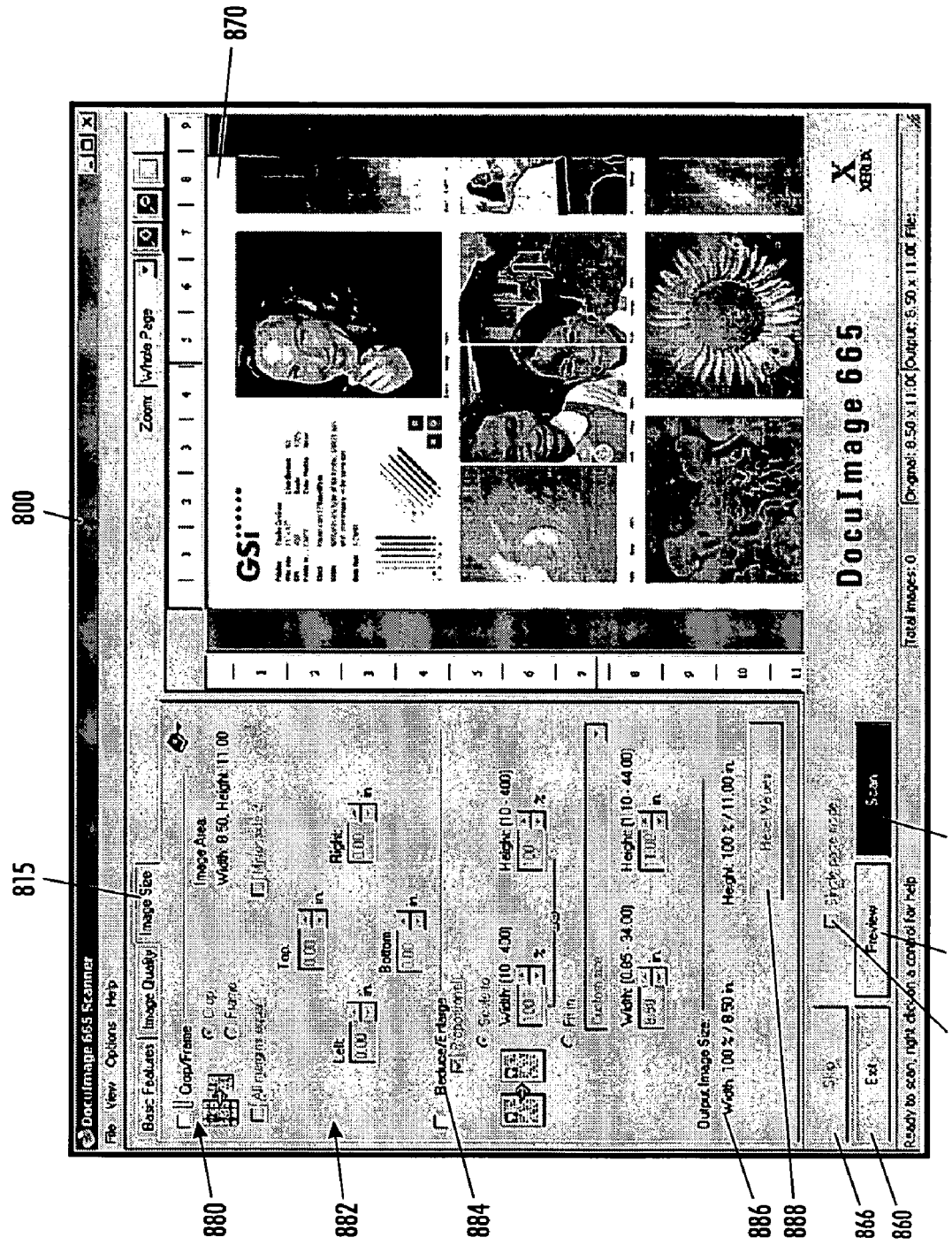
FIG. 11 shows a second exemplary embodiment of a graphical user interface according to this invention.

FIG. 11 shows the image size tab 815 further includes a crop/frame portion 880, a margins portion 882, a reduce/enlarge portion 884, and output image size portion 886, and a reset values portion 888. All of these features are designed to size the image on a page. The reset values button 888 resets the margin portion 882 to all zeros, it also resets the reduce/enlarge portion 884 scale to 100% width and to 100%. The reset values button 888 reset the reduce/enlarge portion 884 fit in width and height to match the page size 734 of the basic features tab 705.

Figure 12:
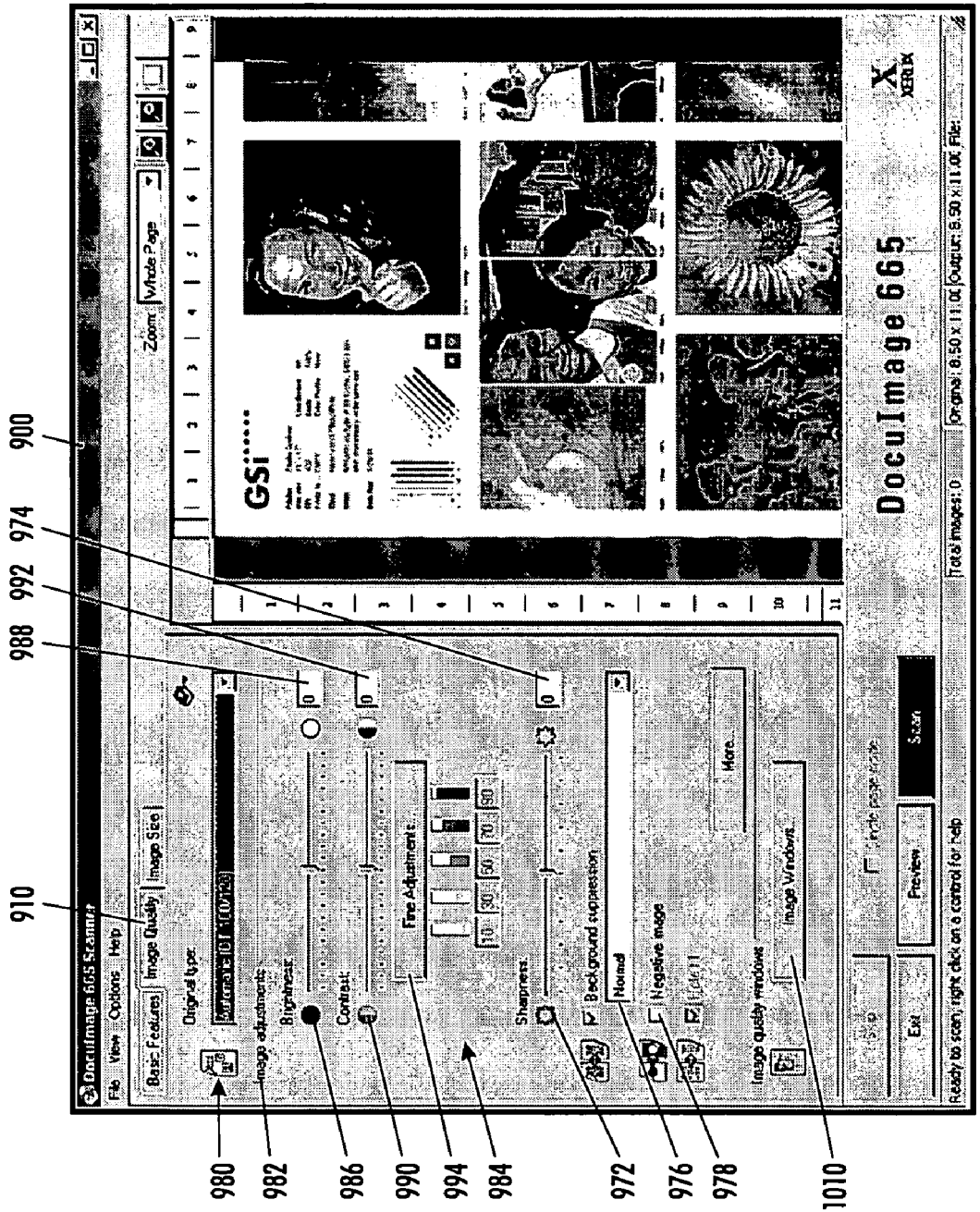
FIG. 12 shows third exemplary embodiment of a graphical user interface according to this invention.

FIG. 12 shows a third exemplary embodiment of a graphical user interface 900. As shown in FIG. 12, the image quality tab 910 includes an image quality profile list box or an original type box 980, an image adjustments portion 982 and an image quality windows portion 1010. The image quality profile list box 980 allows the user to select an image quality profile. Each image quality profile is a collection of all the settings on the image quality tab and the various dialogue boxes and other graphical user interface items that are accessed through the image quality tab. In particular, the image quality profile list box 980 will include the same image quality profiles as will be provided on the basic features tab. When an image quality profile is selected using the image quality profile list box 980, the image quality profile parameters displayed in the various portions of the image quality tab will change accordingly.

The image adjustments portion 982 includes a lighten/darken or brightness slider 986, a lighten/darken value text box 988, an increase/decrease contrast slider 990 and an increase/decrease contrast value text box 992. There is also a fine adjustment box 994 as well to make finer adjustments than the sliders permit. The lighten/darken slider 986 is used to change the overall relationship between the lightness or darkness of the captured electronic image relative to the image on the original document. The lighten/darken value text box 988 indicates the numerical value of the lighten/darken slider 986. Similarly, the increase/decrease contrast slider 990 allows the user to adjust the contrast of the captured electronic image relative to the image on the original document. The increase/decrease contrast value text box 992 indicates the value of the increase/decrease contrast slider 990.

The fine adjustments box 994 includes an access button. This enables a user to make fine adjustments using tone reproduction curve adjustments entered using the special tone adjustments graphical user interface shown in the incorporated U.S. Pat. No. 6,614,456 B1 in place of the standard adjustments applied by the lighten/darken slider 986 and the increase/decrease contrast slider 990.

As shown in FIG. 12, the user can also adjust a sharpness slider 972 in the enhancement image portion 984. A sharpness value text box 974 indicates the numerical value of the sharpness slider 972.

When the background suppression check box 976 is checked, the background suppression function is enabled. Similarly, when a negative image check box 978 is checked, the output image is generated as a negative image relative to the image on the original document. In particular, this inverts the output image values of the captured electronic image relative to the image values of the image on the original document. That is, an image value of the image on the original document of 0 is converted to an image value of the captured electronic image, and vice versa.

FIG. 13 shows a fourth exemplary embodiment of a graphical user interface 1000, which is accessed through image quality tab 710, as shown in FIG. 10, by accessing an image window button 1010, as shown in FIG. 12. FIG. 13 shows an image quality window 1020 over the image quality tab 710. The image quality window 1020 includes many of the same features as found in image quality tab 710 and basic features tab 705. However, this image quality window is used to add and remove windows as discussed above. For example, box 1022 currently indicates that there are no windows. Therefore, any adjustments to the image which are made now by the user would apply to the entire area of the page of image shown in the preview window pane 1070. However, if the user selects an add button 1030, a box will appear in the pane 1070 which the user can move, expand and contract to capture a portion of the entire area image shown in the pane 1070.

Figure 14:
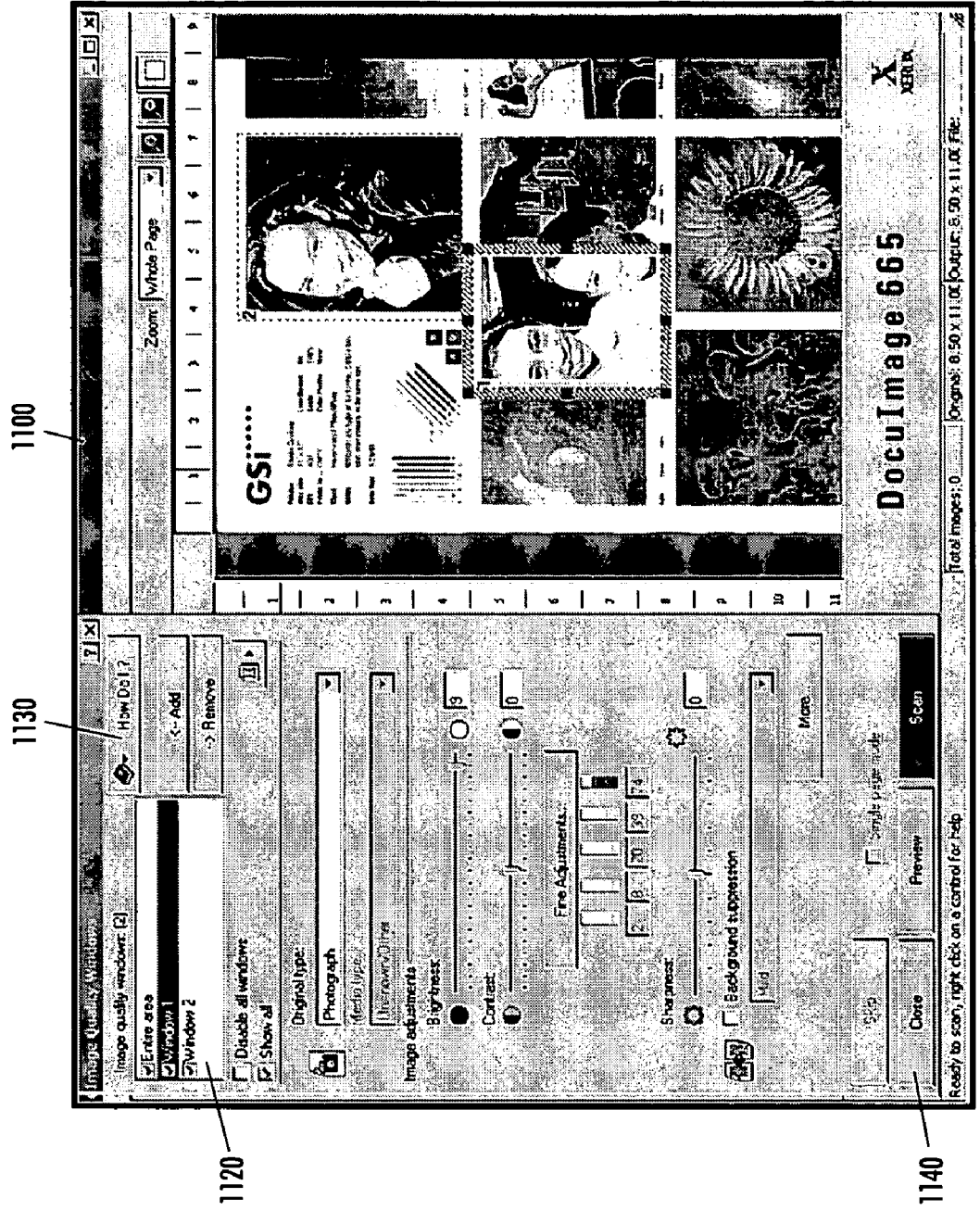
FIG. 14 shows a fifth exemplary embodiment of a graphical user interface according to this invention.

FIG. 14 shows a fifth exemplary embodiment of a graphical user interface 1100 where two windows have been added. Image quality or basic features adjustments shown in image quality window 1120 can now be made to the entire area, window 1, and window 2 when they are selected as shown in FIG. 14. In order for the user to make adjustments only to window 1, the user must select window 1, so that the adjustments only apply to window 1. A "How do I?" button 1130 connects the windows 900 to a help function as discussed above with respect to the incorporated U.S. patent application Ser. No. 09/487,266. In addition, the window is closed by selecting a close button 1140.

Figure 15:
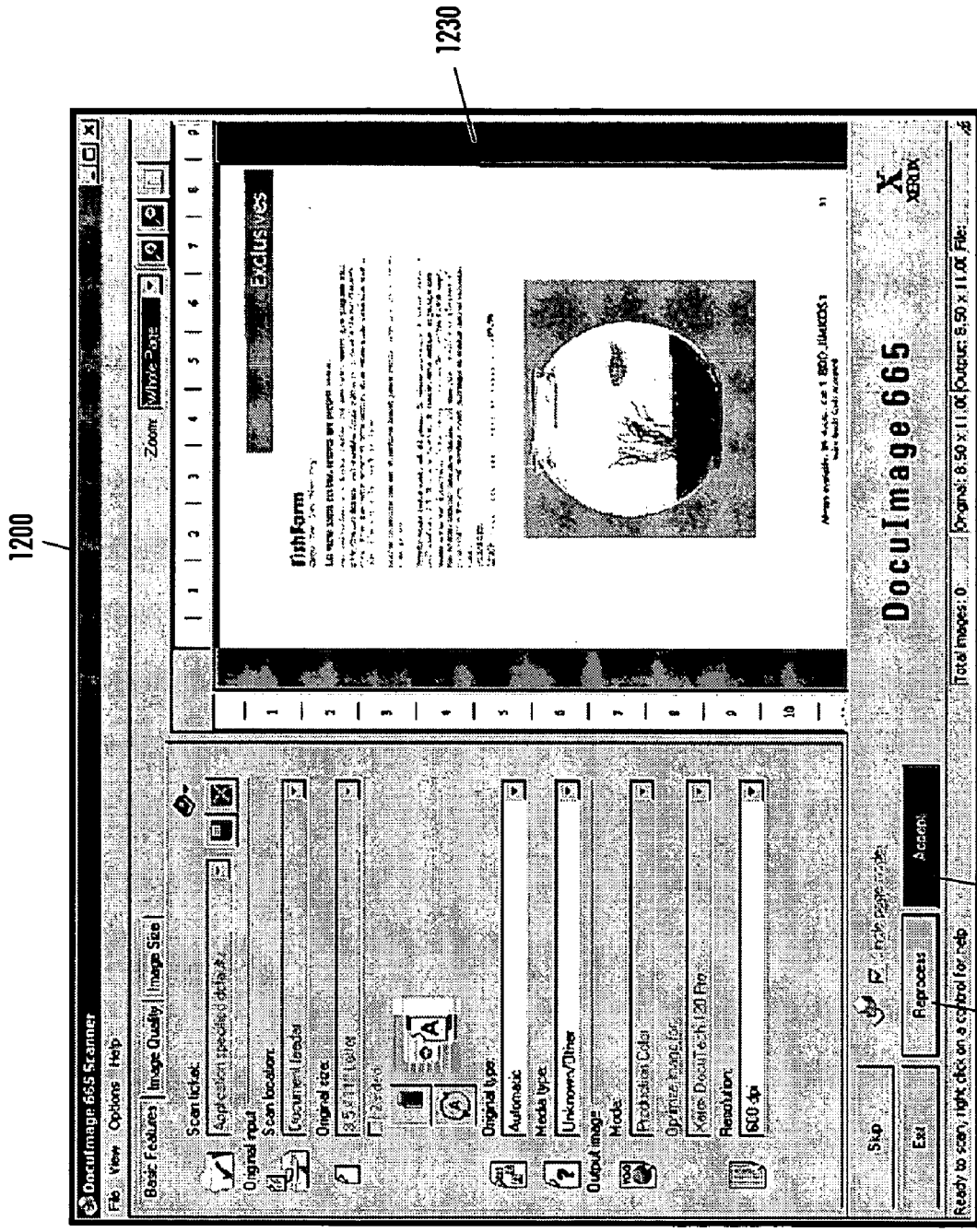
FIG. 15 shows sixth exemplary embodiment of a graphical user interface according to this invention.

FIG. 15 shows a sixth exemplary embodiment of a graphical user interface 1200, and FIG. 16 shows a seventh exemplary embodiment of a graphical user interface 1300. Both FIGS. 15 and 16 show the basic features tab of the graphical user interface. If the document is simplex and the user has selected the preview button, for example, 762 in FIG. 10, then the preview button is replaced with a reprocess button 1210 and the scan button is replaced with an accept button 1220 as shown in FIG. 15. The accept button 1220 may be labeled 'next' (FIG. 16) if the automatically preview next image mode is turned on in the options menu to indicate that the current document has been accepted and the next document is to be scanned. If the automatically preview next image mode is turned off or deselected in the options menu, the scan button is replaced with an accept button 1220.

Alternatively, if the document is duplex, the automatically preview image next image mode is turned on, and the user has chosen to preview the first side of the document by selecting the preview button, then the preview button is replaced with a reprocess button 1210 and the scan button may be replaced with an accept button 1220 as shown in FIG. 15, so that a previewed image of the first page of the document can be reprocessed by selecting the reprocess button 1210, or accepted by selecting the accept button 1220. After the user selects the accept button 1220, the second side of the document is replay scanned and displayed in the preview area 1230. The accept button 1220 is replaced with the next button 1320, so that the user can make adjustments to the second side of the document. Subsequently, the user can reprocess the second side of the document and then accept and return the document to the application by selecting the next button 1320 after the user is satisfied with the image of the second side. In the automatically preview image next image mode, the first page of the next document is scanned, and the graphical user interface displays the preview and scan buttons as shown in FIG. 12, so that the user has the opportunity to preview the next document.

It should be appreciated that the image capture device control systems 200 and 600 shown in FIGS. 2 and 5 can each be implemented on a general purpose computer. However, it should also be appreciated that the image capture device control systems 200 and 600 can also each be implemented on a special purpose computer, a programmed microprocessor or microcontroller and peripheral integrated circuit elements, an ASIC or other integrated circuit, a digital signal processor, a hardwired electronic or logic circuit such as a discreet element circuit, a programmable logic device such as a PLD, PLA, FPGA and/or PAL, or the like. In general, any device, capable of implementing a finite state machine, that is in turn capable of implementing the flowchart shown in FIGS. 7A-8B, can be used to implement either of the image capture device control systems 200 or 600.

The memory 630 shown in FIG. 5 can include both volatile and/or non-volatile alterable memory or non-alterable memory. Any alterable memory can be implemented using any combination of static or dynamic RAM, a hard drive and a hard disk, flash memory, a floppy disk and disk drive, a writable optical disk and disk drive, or the like. Any non-alterable memory can be implemented using any combination of ROM, PROM, EPROM, EEPROM, an optical CD-ROM disk, an optical ROM disk, such as a CD-ROM disk or a DVD-ROM disk and disk drives, or the like.

Thus, it should be understood that each of the elements of the image capture device control systems 200 and 600 shown in FIGS. 2 and 5 can be implemented as portions of a suitably programmed general purpose computer. Alternatively, each of the elements shown in FIG. 2 or 5 can be implemented as physically distinct hardware circuits within a ASIC, or using a FPGA, a PLD, a PLA, or a PAL, or using discreet logic elements or discreet circuit elements. The particular form each of the elements of the image capture device control systems 200 or 600 shown in FIGS. 2 and 5 will take as a design choice and will be obvious and predictable to those skilled in the art.

Moreover, the image capture device control systems 200 or 600 can each be implemented as software executing on a programmed general purpose computer, a special purpose computer, a microprocessor or the like. In this case, the image capture device control systems 200 and 600 can be implemented as routines embedded in a peripheral driver, as a resource residing on a server, or the like.

The image capture device control systems 200 and 600 as well as the image capture device 100 can each also be implemented by physically incorporating them into a software and/or hardware system, such as the hardware and software systems of a digital copier or the like.

While this invention has been described in conjunction with the exemplary embodiments outlined above, various alternatives, modifications, variations, improvements, and/or substantial equivalents, whether known or that are or may be presently unforeseen, may become apparent upon reviewing the foregoing disclosure. Accordingly, the exemplary embodiments of the invention, as set forth above, are intended to be illustrative, not limiting. Various changes may be made without departing from the spirit and scope of the invention.

What is claimed is:

1. A method for scanning and reprocessing an image, comprising:
    capturing image data of an image that is on a recording medium, the capturing being performed by an image scanner;
    storing the scanned image data in a memory of the image scanner;
    processing the scanned image data in accordance with at least one predetermined image parameter;
    transmitting the processed image data to an image capture device control system;
    previewing the processed image data on a display device;
    selecting at least one selectable image parameter;
    providing the at least one selectable image parameter to the image scanner;
    reprocessing the scanned image data stored in the memory of the image scanner in accordance with the at least one selectable image parameter,
    wherein the capturing of the image data of the image that is on the recording medium is performed only once by the image scanner.

2. The method of claim 1, further comprising transmitting the reprocessed image data to the image capture device control system.

3. The method of claim 2, further comprising displaying the reprocessed image data on a display device in communication with the image capture device control system.

4. The method of claim 3, further comprising defining a window that bounds a portion of the processed image data.

5. The method of claim 4, further comprising selecting a second selectable image parameter for the portion of the processed image data bounded by the window.

6. The method of claim 5, further comprising:
reprocessing the scanned image data stored in the memory in accordance with a first selected image parameter;
transmitting the image data reprocessed in accordance with the first selected image parameter to the image capture device control system;
reprocessing the scanned image data stored in the memory in accordance with the second selected image parameter; and
transmitting the image data reprocessed in accordance with the second selected image parameter to the image capture device control system.

7. The method of claim 6, further comprising:
displaying the image data reprocessed in accordance with the first selected image parameter other than the portion of the image data bound by the window; and
displaying the image data reprocessed in accordance with the second selected image parameter corresponding to the portion bound by the window.

8. A system for reprocessing scanned image data, comprising:
an image scanner that captures image data and that generates scanned image data;
a memory of the image scanner which stores the scanned image data;
image processing electronics that processes the scanned image data stored in the memory in accordance with at least one image parameter;
an image capture control system that controls the image scanner to capture the image data and generate the scanned image data, and that provides at least one predetermined image parameter to the image processing electronics for processing the scanned image data:
a display device in communication with the image capture control system and configured to receive and to display image data processed by the image processing electronics; and
a selector of the image capture control system which selects at least one selectable image parameter, the image capture control system being further configured to provide the at least one selectable image parameter to the image processing electronics for reprocessing the scanned image data,
wherein the capturing of the image data of the image that is on the recording medium is performed only once by the image scanner.

9. The system of claim 8, further comprising:
a memory controller in communication with the memory; and
a scanner control module in communication with the memory controller and the image processing electronics, and which controls the reprocessing of the scanned image data stored in the memory in accordance with the at least one selected image parameter from the image capture control system.

10. The system of claim 8, wherein the selector selects a window bounding a portion of the image data displayed on the display device and selects a second selectable image parameter for the image data bounded by the window.

11. The system of claim 10, wherein the image capture control system provides the second selectable image parameter to the image scanner, and the image processing electronics reprocesses the scanned image data in accordance with the second selectable image parameter.

12. The system of claim 11, wherein:
the image capture control system receives the reprocessed image data; and
the image capture control system causes the display device to display the image data reprocessed in accordance with the at least one selectable image data other than the portion of the image data bound by the window and causes the display device to display the image data reprocessed in accordance with the second selectable image data corresponding to the portion bound by the window.

13. A computer program product, comprising:
a computer readable storage medium having computer readable program code embodied therein for causing a computer to preview image data, the program code comprising:
computer readable program code for causing a computer to cause an image scanner to capture image data from an image that is on a recording medium and to cause the image scanner to store the scanned image data in a memory;
computer readable program code for causing the computer to provide the image scanner with at least one predetermined image parameter and to control the image scanner to process the scanned image data by the at least one predetermined image parameter;
computer readable program code for causing the computer to cause a display device to receive and display the processed image data;
computer readable program code for causing the computer to enable selecting at least one selectable image parameter; and
computer readable program code for causing the computer to send the at least one selectable image parameter to the image scanner for reprocessing of the scanned image data in accordance with the at least one selectable image parameter,
wherein the capturing of the image data of the image that is on the recording medium is performed only once by the image scanner.

14. The computer program product of claim 13, further comprising computer readable program code for causing the computer to receive and display the reprocessed image data.

15. The computer program product of claim 14, further comprising computer readable program code for causing the computer to define a window that bounds a portion of the image data.

16. The computer program product of claim 15, further comprising computer readable program code for causing the computer to select a second selectable image parameter for the portion of the image data bounded by the window.

17. The computer program product of claim 16, further comprising:
computer readable program code for causing the computer to reprocess the scanned image data stored in the memory in accordance with a first selected image parameter;
computer readable program code for causing the computer to transmit the image data reprocessed in accordance with the first selected image parameter to the computer;
computer readable program code for causing the computer to reprocess the scanned image data stored in the memory in accordance with the second selected image parameter; and computer readable program code for causing the computer to transmit the image data reprocessed in accordance with the second selected image parameter to the computer.

18. The computer program product of claim 17, further comprising:

computer readable program code for causing the computer to display the image data reprocessed in accordance with the first selected image parameter other than the portion of the image data bound by the window; and computer readable program code for causing the computer to display the portion of the image data reprocessed in accordance with the second selected image parameter corresponding to the portion bound by the window.

* * * * *